United States Patent [19]

Heino

[11] 4,414,863

[45] Nov. 15, 1983

[54] AUTOMATIC ELECTRONIC CONTROL FOR A POWER SHIFT TRANSMISSION

[75] Inventor: Dean L. Heino, Cedar Falls, Iowa

[73] Assignee: Deere & Company, Moline, Ill.

[21] Appl. No.: 418,145

[22] Filed: Sep. 15, 1982

Related U.S. Application Data

[63] Continuation of Ser. No. 122,404, Feb. 19, 1980, abandoned.

[51] Int. Cl.³ .................. F16H 3/74; B60K 41/18
[52] U.S. Cl. ............................. 74/866; 74/752 A; 74/752 D; 74/731; 74/733; 74/861; 74/878
[58] Field of Search ............... 74/866, 752 A, 752 D, 74/731, 733, 645, 843, 861, 862, 877, 878; 192/0.033, 3.63, 3.58, 3.31

[56] References Cited

U.S. PATENT DOCUMENTS

| | | | |
|---|---|---|---|
| 3,448,640 | 6/1969 | Nelson | 74/866 |
| 3,684,066 | 8/1972 | Kubo et al. | 192/4 A |
| 3,702,572 | 11/1972 | Wakamatsu et al. | 74/866 |
| 3,756,358 | 9/1973 | Espenshied et al. | 74/339 |
| 3,805,640 | 4/1974 | Schneider et al. | 74/866 X |
| 3,876,028 | 4/1975 | Asano et al. | 74/866 |
| 3,885,472 | 5/1975 | Wakamatsu et al. | 74/866 |
| 3,939,738 | 2/1976 | Abey et al. | 74/861 X |
| 4,015,488 | 4/1977 | Akeson et al. | 74/866 |
| 4,027,554 | 6/1977 | Ito et al. | 74/866 |
| 4,033,202 | 7/1977 | Ahlen et al. | 74/866 |
| 4,067,423 | 1/1978 | Schneider et al. | 74/878 |
| 4,079,638 | 3/1978 | Sibend | 74/866 |
| 4,126,061 | 11/1978 | Fry | 74/866 |
| 4,201,098 | 5/1980 | Harvey | 74/761 |
| 4,208,925 | 6/1980 | Miller et al. | 74/866 |
| 4,208,929 | 6/1980 | Heino et al. | 74/866 |
| 4,271,728 | 6/1981 | Wakamatsu | 74/866 |

Primary Examiner—Kenneth Dorner
Assistant Examiner—D. Wright

[57] ABSTRACT

A controller including a microprocessor for automatically shifting a transmission and selectively locking and unlocking a torque converter connecting the engine with the transmission. The controller has both manual and automatic modes of operation. In the automatic mode, one of three different shift patterns is automatically selected depending on the condition of a transport/loading mode switch and a throttle position switch. Transmission output speed is monitored and downshifts are prevented when the output is accelerating. Solenoid valves which are selectively activated to shift the transmission are monitored for open- or short-circuits. When a faulty solenoid is detected, the controller prevents shifting to a gear ratio which utilizes that solenoid and a display flashes diagnostic information including the gear ratios still available. The solenoids are pulsed at one of two duty cycles depending on the voltage level of the power supply.

54 Claims, 26 Drawing Figures

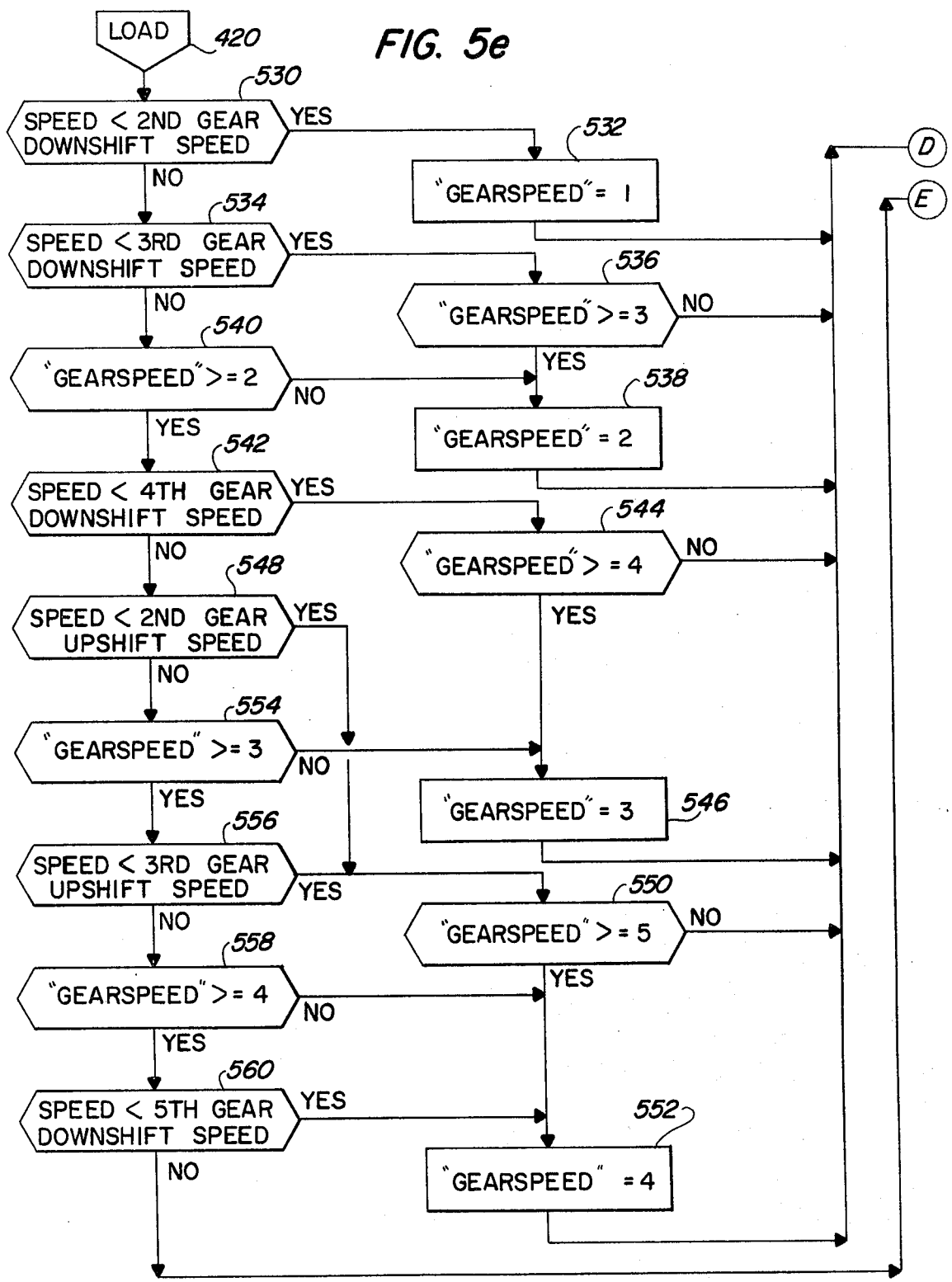

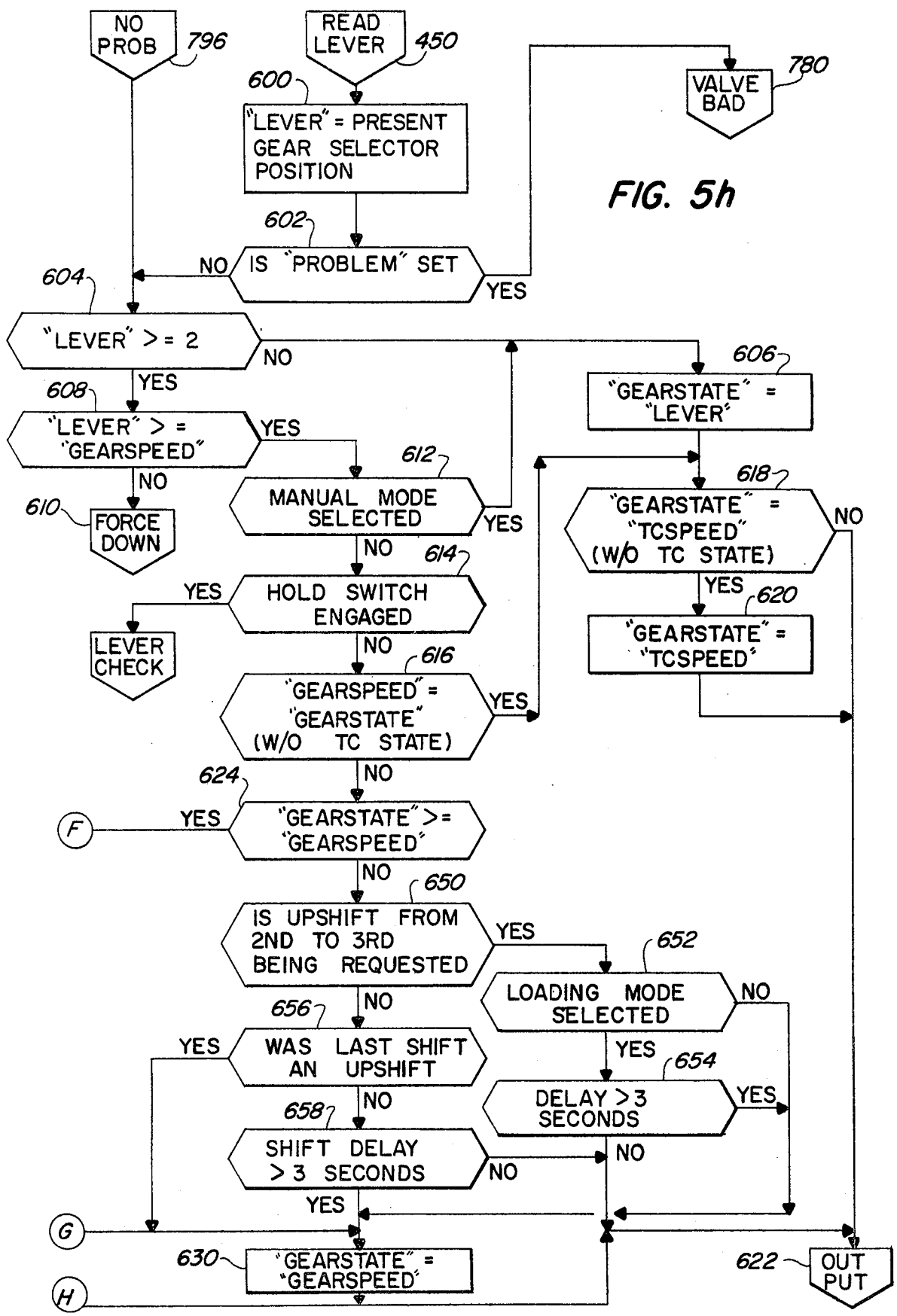

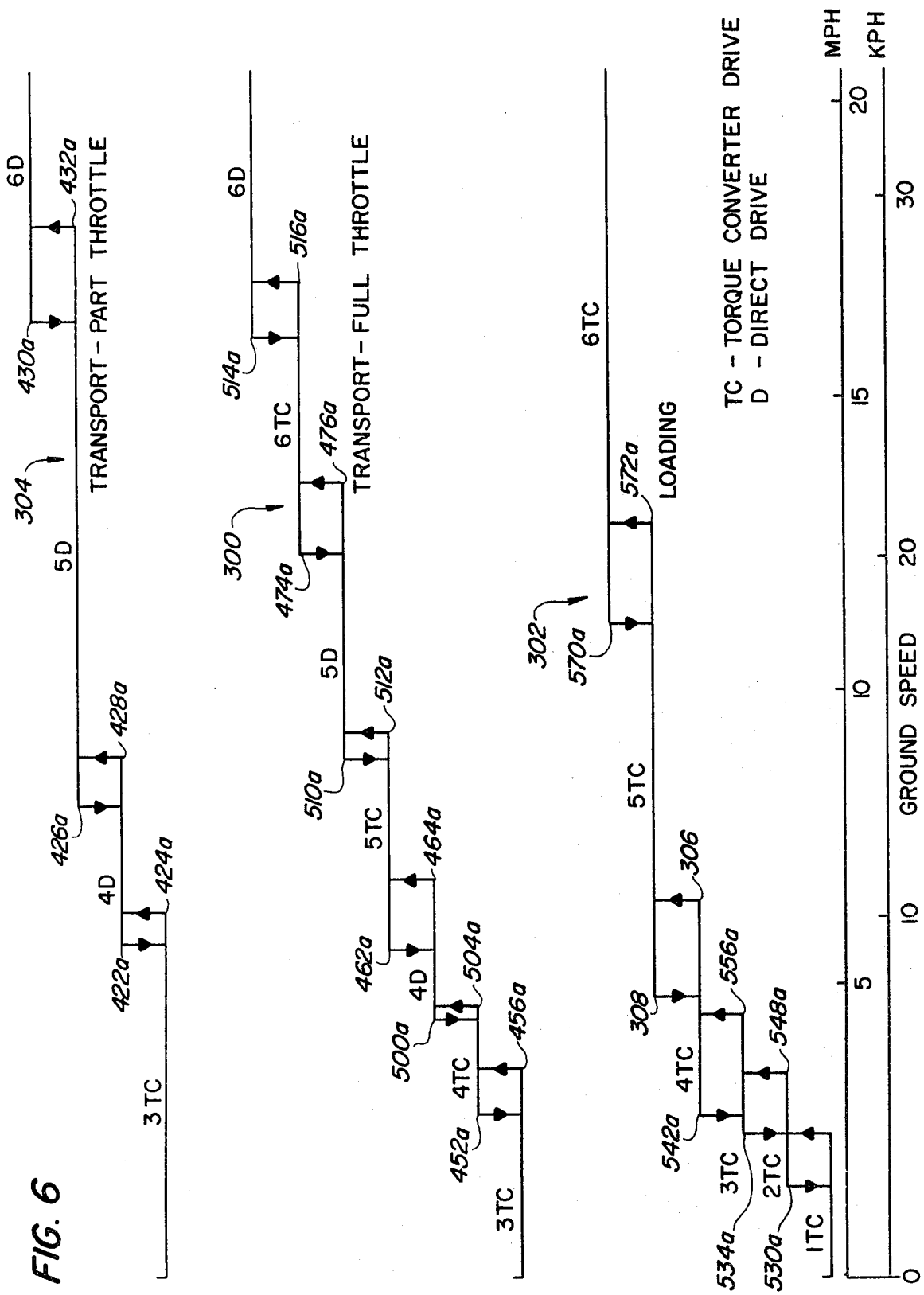

FIG. 7

| GEAR SELECTOR SWITCH | GEAR DISPLAY | SOLENOID ACTUATED | | | | | | ELEMENTS ENGAGED | | | | | | |
|---|---|---|---|---|---|---|---|---|---|---|---|---|---|---|
| | | SV1 | SV2 | SV3 | SV4 | SV5 | SV6 | C1 | B1 | B2 | B3 | B4 | C2 | CT |
| REVERSE | - | O | O | O | O | O | - | | | | | | | |
| NEUTRAL | O | O | O | O | O | O | | | | | | | | |
| 1 | 1 | - | - | - | - | - | - | | | | | | | |
| 2 | 2 | O | O | - | O | - | O | | x | x | | | | |
| 3 | 3 | O | - | O | O | - | O | | x | | x | | | |
| 4 | 4 | O | O | * | * | O | O | | x | | | x | | |
| 5 | 5 | - | - | - | * | O | O | | | x | | x | x | |
| 6 | 6 | - | - | - | * | - | O | x | | | | x | x | |

* DEPENDS ON SPEED - SEE FIG. 6

FIG. 8

| DEFECTIVE SOLENOID OR CIRCUIT | RESULT |
|---|---|
| | SEQUENTIAL FLASHING OF GEAR NUMBERS |
| SV1 | -,1,2,3,4 |
| SV2 | -,2,4 |
| SV3 | STABLE 0 |
| SV4 | -,1,2,3,4,5,6 |
| SV5 | 3,4,6 |
| SV6 | 1,2,3,4,5,6 |

AUTOMATIC ELECTRONIC CONTROL FOR A POWER SHIFT TRANSMISSION

This is a continuation of application Ser. No. 122,204, abandoned, filed Feb. 19, 1980.

BACKGROUND OF THE INVENTION

The present invention relates generally to an electronically controlled transmission for industrial vehicles and more particularly to an improved electronically controlled transmission of the type shown in co-pending application, Ser. No. 752,747 with the same title and assignee, filed Dec. 21, 1976, now U.S. Pat. No. 4,208,929.

In the past, industrial vehicles were provided with a transmission having a single operating mode which was a compromise between the transmission conditions required for work situations when the vehicle was being used as designed and for transport situations when the vehicle was being driven from work site to work site.

Generally, in industrial vehicles such as scrapers, a large number of transmission gear ratios at slow speeds are desirable for performing the precision off-highway work functions with toque converter operation available to smooth out transmission shocks due to abrupt loading and unloading of the engine. When the vehicle is driven on-highway for transport between work sites, it is desirable to increase engine efficiency by locking up the energy wasting torque converter and by providing a smaller number of gear ratios to reach highway speeds.

The aforementioned patent describes a transmission in which an automatic electronic control selectively provides two distinct modes of transmission operation; a first mode for work situations and a second mode for transport situations. In the second, or transport, mode the transmission shifts through an upper range of gear ratios (i.e., third through sixth gears) with the torque converter locked to provide direct drive only during the upper speeds of the fourth, fifth and sixth gear ratios and with the torque converter in operation at the lower speeds of these ratios. When the vehicle is decelerating, it tends to coast during the times the torque converter is operating because the engine does not aid in braking.

After the transmission upshifts automatically, the vehicle may slow sufficiently under load to a speed below the downshift speed. Although upshift-downshift hysteresis and time delay between shifting are provided by the transmission controller to limit hunting, needless downshifting can occur if the vehicle momentarily remains below the downshift speed after the delay. Under certain vehicle load conditions, the transmission will be shifted to a higher gear ratio and immediately the vehicle will slow to below the downshift speed but still begin to accelerate. However, if the vehicle does not accelerate beyond the downshift speed before the end of the time delay, which typically is several seconds, downshifting will occur, followed shortly thereafter by an upshift as the speed increases beyond the upshift point of the lower gear ratio. The problem can be lessened somewhat by extending the shifting delay time and/or the upshift-downshift hysteresis, but engine lugging or overspeed and non-optimum shifting can result from excessive extension of these parameters.

Solenoid valves which are operated by the control to establish the various transmission operative conditions are subject to severe environmental conditions, as well as to variable supply voltage levels as engine speed and power supply loads change. The solenoid coils and the lead wires can open- or short-circuit. At low voltages, the solenoids may not be pulled or held in properly. If a solenoid drops out while the transmission is in a given gear, there may be insufficient voltage to pull the solenoid in again and an undesired gear change can occur. Over-heating of the solenoids is a problem if voltage is higher than the recommended operating level. If a solenoid is defective, the gear ratios which require the bad solenoid will be inoperative or a speed other than the one selected will result. Diagnosing a defective solenoid valve can be time consuming.

SUMMARY OF THE INVENTION

It is therefore an object of the present invention to provide an electronically controlled transmission which eliminates the aforementioned problems.

It is another object of the present invention to provide an electronically controlled transmission which effectively uses the engine for braking during deceleration.

It is yet another object of the present invention to provide an electronically controlled transmission which reduces hunting and eliminates needless downshifting. It is still another object to provide a control for such a transmission that includes an automatic mode for establishing an optimum shift sequence for the given conditions encountered.

It is another object of the present invention to provide an automatic transmission with an enhanced operating cycle which allows an operator to concentrate on the ground working operation rather than the vehicle controls.

It is a further object of the present invention to provide an electronically controlled transmission with selectively activatable solenoid valves that are controlled by a circuit which provides reliable solenoid pull-in and hold-in without coil overheating, regardless of fluctuations in power supply voltage or intermittent short- or open-circuits of the solenoids or wiring harnesses.

It is another object of the present invention to provide circuitry for an electronically controlled transmission which checks the solenoid coils and leadwires and prevents shifting to a gear ratio which utilizes a defective solenoid circuit. It is a further object to provide such circuitry with a diagnostic readout for quickly determining which gear ratios are operative and for locating faulty wiring harnesses and/or solenoids.

A transmission system includes solenoid valves which are selectively energized by microprocessor controlled circuitry to shift the transmission and lock or unlock a torque converter depending on inputs from a ground speed pickup, a gear selector switch, a shift inhibit switch, an automatic/manual switch, a throttle position switch, and a work/transport mode switch. In the "transport" mode at higher gear ratios, an electronic controller locks the torque converter when the throttle is below a preselected setting so that the braking force of the engine is utilized. The controller monitors acceleration and if, after a pre-selected delay after the transmission has shifted to a higher gear the vehicle is accelerating, downshifting is prevented even if the speed is below a normal downshift speed.

The rated voltage of the solenoids are less than the nominal supply voltage available on the vehicle, and a relatively long full voltage pulse is used on solenoid turn-on to assure reliable pull-in. Thereafter, to prevent overheating, the solenoids are pulse driven at one of two duty cycles depending on whether supply voltage is above or below a pre-selected voltage level. A checking circuit detects open- or short-circuited solenoids and wiring harnesses and prevents selection of a gear ratio which utilizes a faulty solenoid. If a momentary short- or open-circuit is detected, pull-in pulses are applied to the appropriate valves in the event that one or more solenoids dropped out of operation during the momentary problem. A digital display indicates the gear ratio selected and also serves as a diagnostic tool by flashing the gear ratios that are still available when a faulty solenoid is detected.

The above and additional objects, features and advantages of the present invention will become apparent to those skilled in the art from a reading of the following detailed description when taken in conjunction with the accompanying drawings.

BRIEF DESCRIPTION OF THE DRAWINGS

FIG. 6 is a chart illustrating three automatic modes of operation of the present invention;

FIG. 7 is a chart showing which solenoids, brakes, and clutches are activated, as well as the indicator output displayed, for each gear;

FIG. 8 shows the diagnostic display provided on the indicator for a given solenoid valve when a short- or open-circuit is detected for that valve;

FIG. 9 is a block diagram of the microprocessor shown in FIG. 2a;

DESCRIPTION OF THE PREFERRED EMBODIMENT

Figure 1:
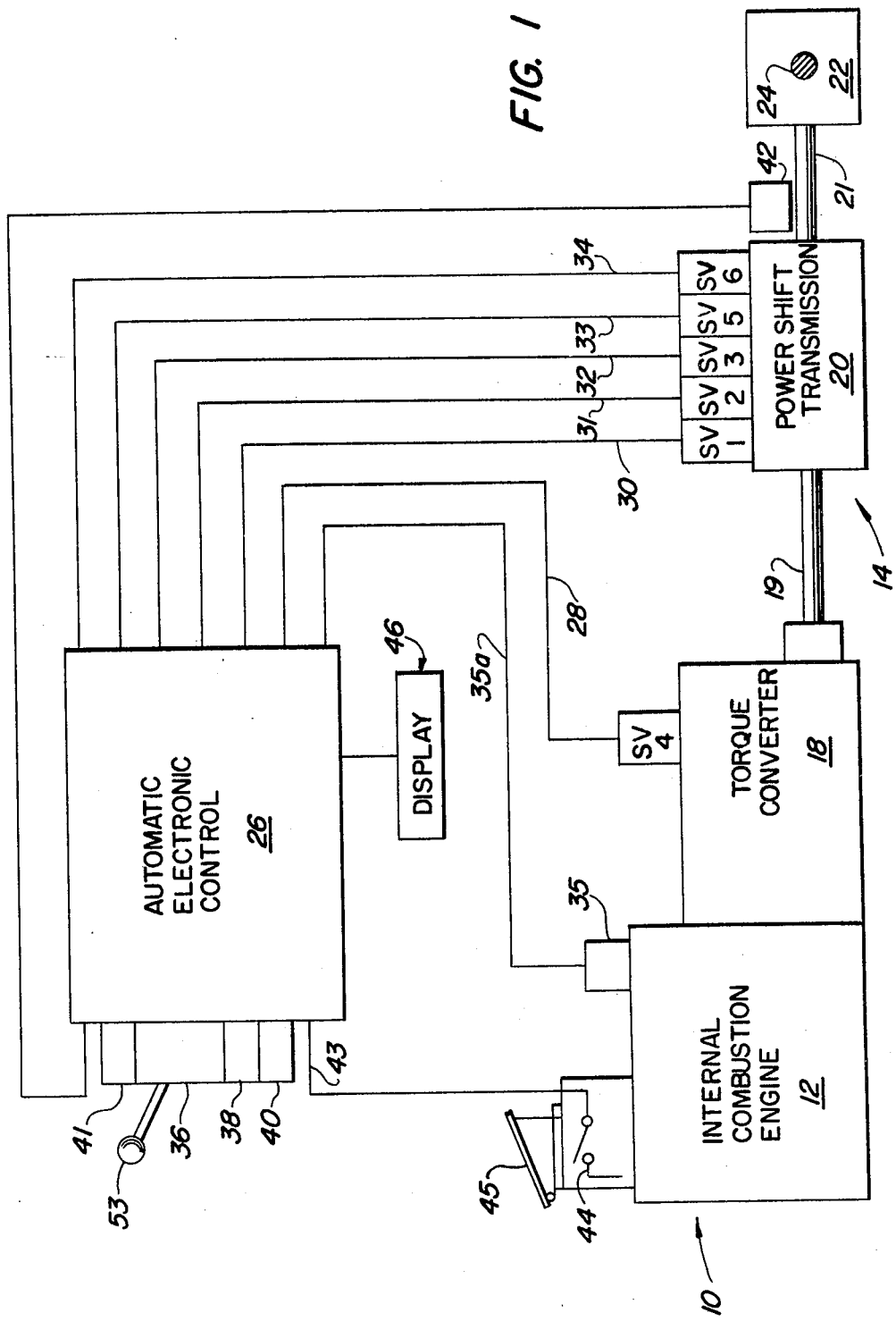
FIG. 1 is a diagrammatic view of a transmission system in accordance with the present invention.

Referring now to FIG. 1, therein is shown a vehicle drive system 10. The drive system 10 includes an internal combustion engine 12 driving a transmission system 14 which includes a conventional torque converter 18 which drives a conventional power shift mechanical transmission 20 through a shaft 19. The power shift transmission 20 in the preferred embodiment has a plurality of selectable gear ratios to provide six forward and one reverse speed outputs through a drive shaft 21 to a conventional gear-type differential 22 which drives a vehicle wheel axle 24.

Figure 11:
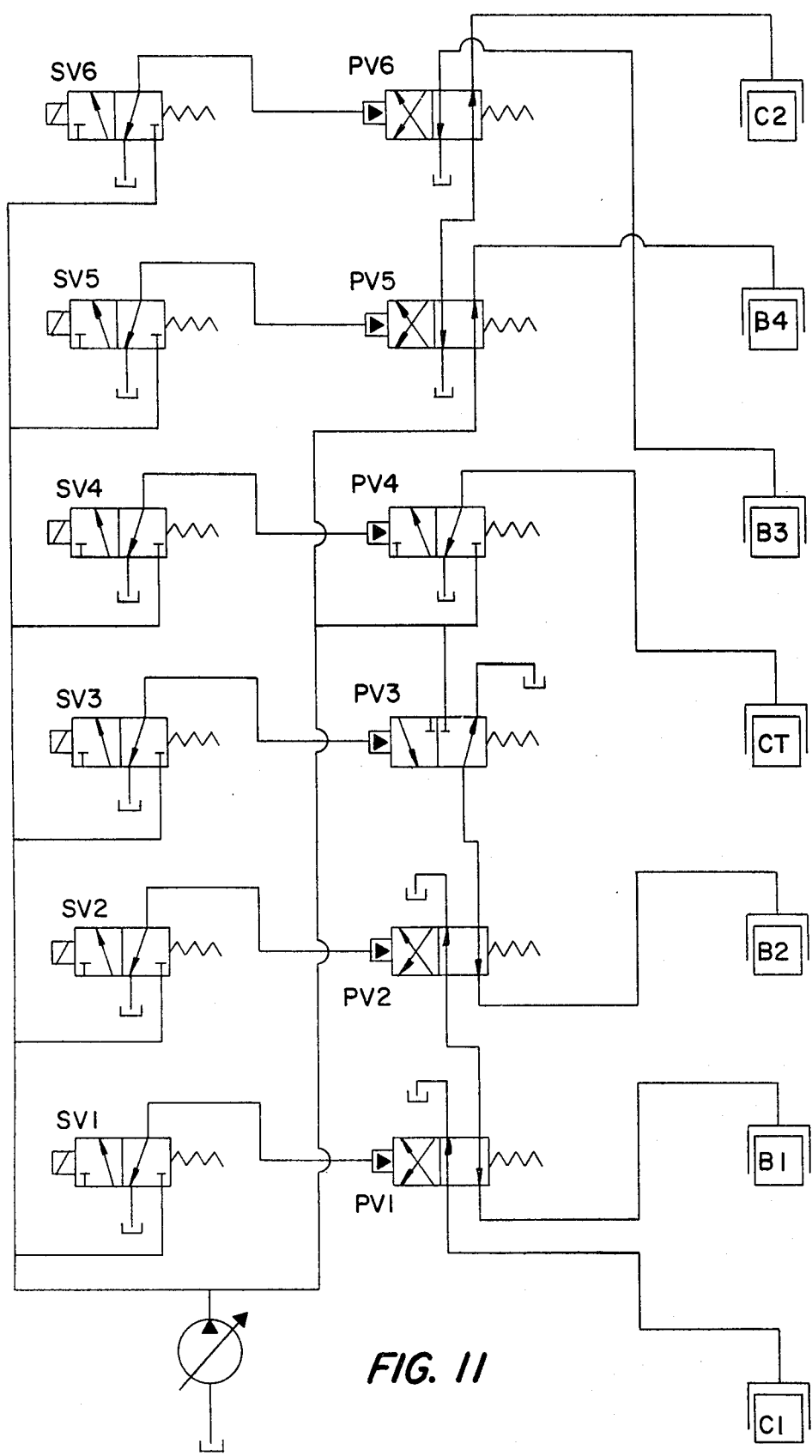
FIG. 11 is a hydraulic schematic showing the valves which control the various brakes and clutches on a transmission.

The torque converter 18 and transmission 20 are controlled by an automatic electronic control generally designated by the numeral 26 which provides control signals via line 28 to a lockup solenoid valve SV4 on the torque converter 18 and to solenoid valves SV1, SV2, SV3, SV5 and SV6 via lines 30-34 for selectively supplying pressurized fluid for activating various brakes and clutches (FIGS. 7 & 11) in the transmission 20 to change the gear ratio. FIG. 11 shows the arrangement of the solenoid valves SV1-SV6 which control corresponding pilot valves PV1-PV6 to operate three clutches C1, C2 and CT and four brakes B1-B4 in a six speed forward—one speed reverse transmission. If a more detailed description of the transmission is desired, reference may be had to U.S. Pat. No. 4,201,098 entitled "Transmission", corresponding to an original application Ser. No. 735,379, filed on Oct. 26, 1976 by James R. Harvey assigned to the assignee of the present invention. The transmission described therein does not include a torque converter lockup clutch CT, but the operation of such a clutch is well known to those skilled in the art. The automatic electronic control 26 further provides a control signal over line 35a to a starter circuit and motor 35 to allow start-up of the engine 12. A digital display 46 is connected to the control 26 for providing gear select and diagnostic information.

The electronic control 26 is provided with inputs from a shift control 36, a mode control 38, a hold shift control 40, a manual/automatic operation control 41, and a conventional transmission output speed sensor 42 which is operatively associated with the drive shaft 21. An input is also provided over line 43 from a throttle positon switch 44 operably associated with an engine throttle 45.

THE ELECTRONIC CONTROL

Figure 2A:
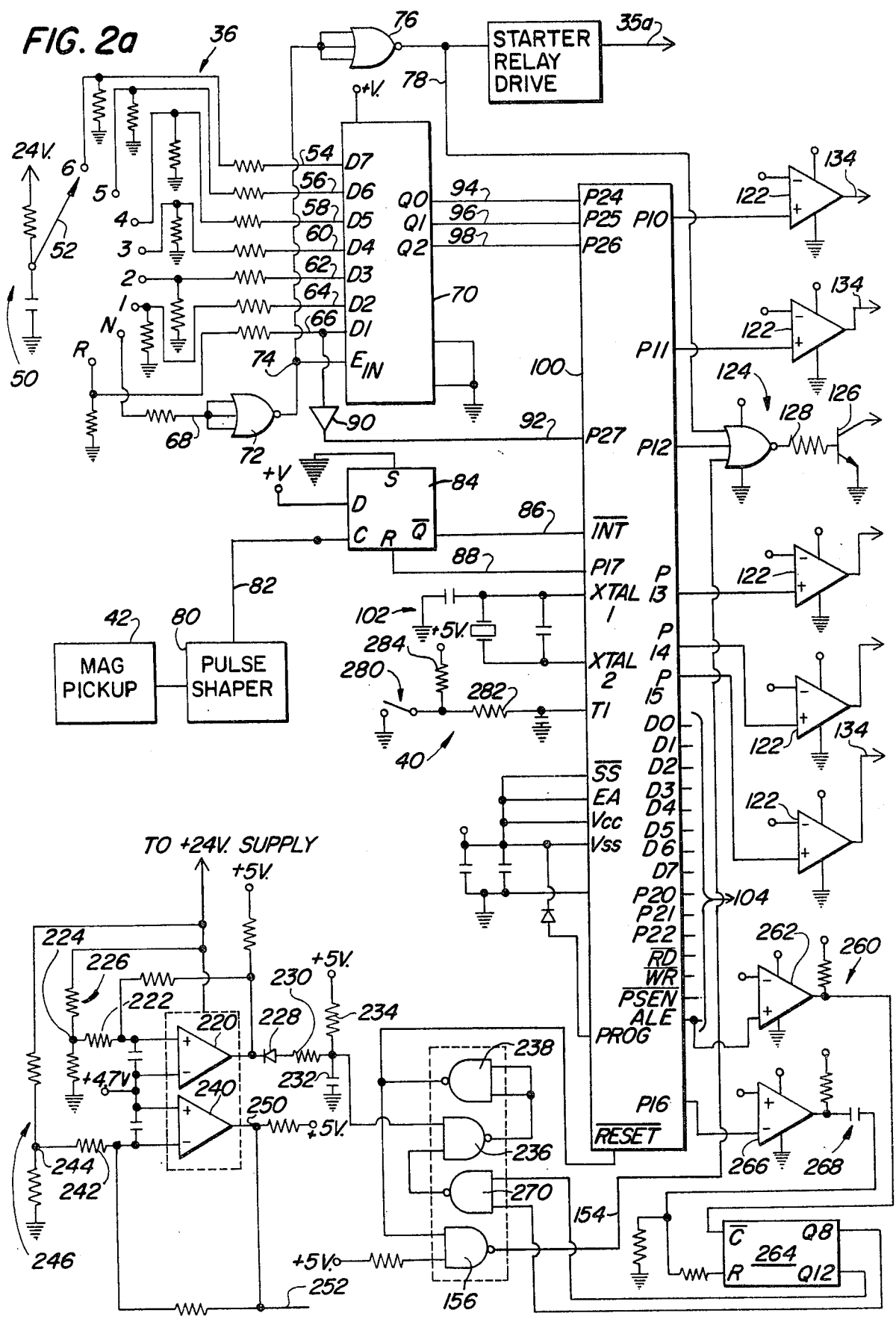
FIGS. 2a-2b is a schematic diagram of a portion of the present invention.
Figure 2B:
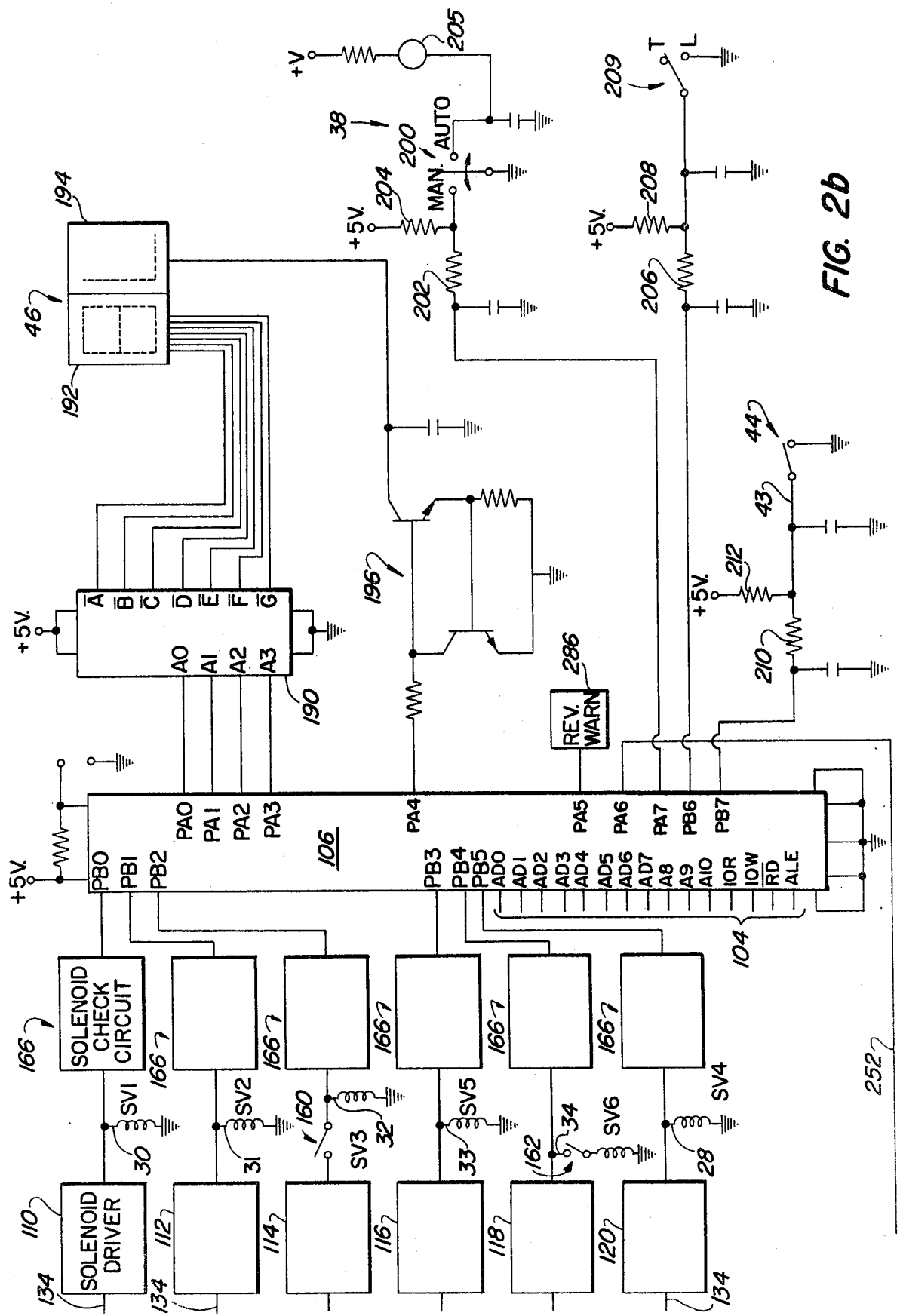

Referring now to FIGS. 2a-2b, therein is shown the automatic electronic control 26. The shift control 36 includes a selector switch 50 with a contact arm 52 controlled by a gear selector lever 53 (FIG. 1) for selectively applying a positive voltage to one of the lines 54-68. Each position of the switch 50 corresponds to a pre-selected transmission gear ratio. The lines 54-66 are connected to the inputs D7-D1, respectively, of an 8-bit priority encoder 70 which in the preferred embodiment is an MCI4532 integrated circuit available from Motorola, Inc. The line 68, which corresponds to the "neutral" position of the gear selector lever, is connected to the three inputs of a NOR gate 72. The output 74 of the NOR gate 72 is connected to the Ein input of the encoder 70 so that when the selector switch 50 is in the "neutral" position and a positive voltage or logic "1" appears on the line 68, Ein will be at logic "0". The output 74 is also connected to the inputs of a NOR gate 76 so that its output 78 is "high" whenever the switch 50 is in the "neutral" position. The starter circuit 35 is enabled when the output 78 is "high".

The magnetic pickup 42 provides an a-c signal having a frequency dependent on the rotational speed of the drive shaft 21. A conventional shaping circuit 80 converts the a-c signal into a pulse train. In the preferred embodiment, about 70 pulses per second are produced for each mile per hour of vehicle speed. The output 82 of the shaping circuit is connected to the "C" input of a D flip-flop 84. A rising edge on the signal on the line 82 will clock the "Q̄" output at line 86 to the "low" level. The output at line 86 remains "low" until a reset voltage on line 88 is applied to the "R" input of the flip-flop. The reverse line 66 is connected to a buffer 90. The output 92 of the buffer 90 is connected to terminal P27 of port 2 of a microprocessor 100.

The outputs "Q0-Q2" of the encoder 70 are connected by lines 94-98 to inputs P24-P26 of the microprocessor 100 which in the preferred embodiment is a model 8035 microcomputer available from the Intel Corporation of Santa Clara, Calif. Encoded shift lever position information is provided to the inputs P24-P27 over the lines 92-96.

The processor 100 includes an interrupt input $\overline{INT}$ connected to the line 86 so that when the output "$\overline{Q}$" is clocked low, a program interrupt is initiated and the pulse from the shaping circuit 80 is counted. The "R" input 88 is connected to terminal P17 which outputs a reset pulse to reset the flip-flop 84 so "$\overline{Q}$" is returned to the "high" state immediately after the processor 100 recognizes a "low" state at the $\overline{INT}$ input. The microprocessor 100 determines the average time required to count a pre-selected number of pulses from the magnetic pickup 42 and the average time is inversely proportional to the speed of the shaft 21. A crystal oscillator circuit 102 connected between XTAL1 and XTAL2 terminals provides a frequency reference, which preferably is 6 MHz, for the clock and timing circuitry within the processor.

Interfaced directly with the microprocessor 100 via bus 104 is a program memory and input/output expander 106 (FIG. 2b) which in the preferred embodiment is an Intel 8355 ROM and I/O Expander. The expander 106 provides up to 2 K words of program memory and adds 16 input/output lines (PA0-PA7 and PB0-PB7). The ROM is mask programmable and is accessed by applying 11 bits of address to the AD0-A10 inputs from a bus port (D0-D7) and outputs P20-P22 (Port 2) of the microprocessor 100. Detailed descriptions and instructions for the use of the microprocessor 100 and the ROM and I/O Expander 106 are provided in *MCS-48 TM Family of Single Chip Microcomputers User's Manual* available from the Intel Corporation. A program flowchart is discussed in detail below.

Figure 3:
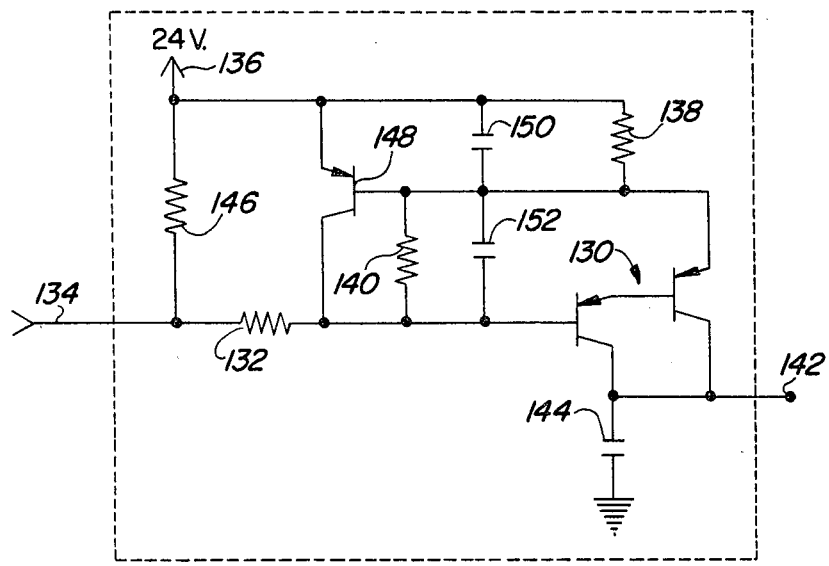
FIG. 3 is a schematic diagram of one of the block elements of FIG. 2.

Outputs P10-P15 (Port 1) of the microprocessor 100 are connected to solenoid valve driver circuits 110-120 through comparator circuits 122 and a 3-input NOR gate circuit 124. The output of the NOR gate 124 is connected to the base of an n-p-n transistor 126 through a resistor 128. The driver circuits 110-120 are essentially identical and include a Darlington pair 130 (FIG. 3) with the input base connected through a resistor 132 to an input terminal 134. The emitter of the drive transistor is connected to a nominal 24-volt supply 136 through a current sensing resistor 138 and to the input base via a resistor 140. The output of the Darlington pair 130 is connected to an output terminal 142 which is connected either directly (SV1, SV2, SV4, SV5) or through a switch (SV3 and SV6) to the corresponding one of the solenoids. A capacitor 144 is connected between the terminal 142 and ground. Each drive circuit is biased toward a normally "off" condition by a pull-up resistor 146 connected between the input terminal 134 and the supply 136. A "low" level is required at the input terminal 134 to turn on the driver circuit. A current limiting p-n-p transistor 148 has its emitter connected to the supply 136 and its collector to the input of the Darlington pair 130. The base of the transistor 148 is connected between the current sensing resistor 138 and the emitter of the Darlington pair 130. If output current exceeds a pre-selected limit dependent on the valve of the resistor 138, the transistor 148 will conduct increasing the voltage at the input base of the Darlington pair 130 to limit the current therethrough. Filtering capacitors 150 and 152 are connected from the base of the transistor 148 to the power supply 136 and to the Darlington pair input to provide immunity to RF noise.

A transition from a "high" to a "low" level at a terminal P10-P11, P13-P15 of the microprocessor 100 will switch the output of the corresponding comparator 122 to the "low" level thereby activating the driver circuit. The driver circuit 114 for the "neutral" solenoid valve SV3 is turned on only if the three inputs to the NOR gate 124 are all at the "low" level. This condition occurs when the selector switch 50 is in the "neutral" position, the microprocessor terminal P12 is "low", and the output 154 of a NAND gate 156 is "low". One of the inputs to the NAND gate 156 is connected to the "RESET" terminal of the microprocessor 100 and the other to the nominal 5-volt supply. A RESET condition will cause the output 154 to go "high" and prevent activation of the drive circuit 114 for the solenoid valve SV3 which must be activated for every gear ratio except "neutral".

To prevent shifting out of neutral when the gear selector lever is in neutral and shifting into reverse when the gear selector lever is in the forward range, the circuits that control the solenoids are routed through switches 160 and 162 operably connected to the shift control. Switch 160 is opened when the lever is in the "neutral" position to prevent the controller from activating solenoid valve SV3 and shifting the transmission out of neutral. The switch 162 is closed only when the shift lever is in "neutral" or "reverse" to prevent any unexpected shifts to reverse while the gear selector is in the forward range. Solenoid valve SV6 is activated only in reverse. A chart of solenoid valve state for each gear ratio is shown in FIG. 7.

Figure 4:
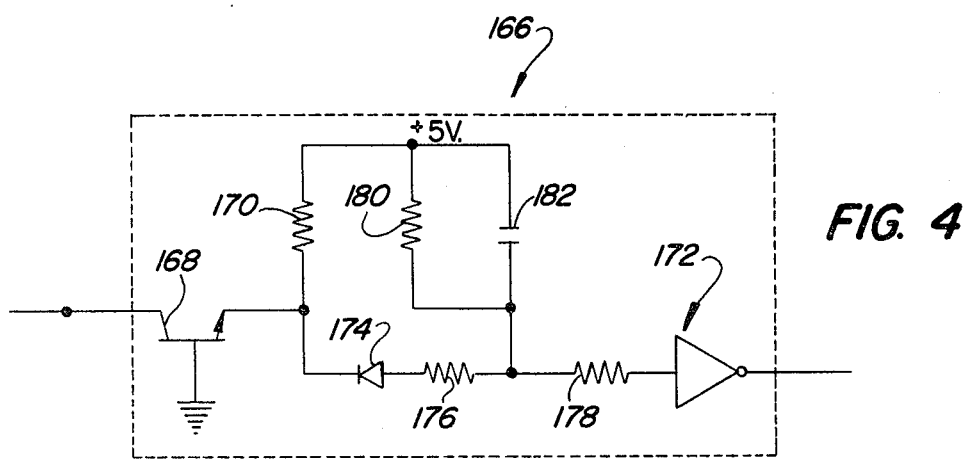
FIG. 4 is a schematic diagram of another of the block elements of FIG. 2.

A circuit 166 for detecting solenoid and wiring harness condition is connected to each of the terminals 142 of the solenoid driver circuits 110-120. An n-p-n transistor 168 (FIG. 4) which normally operates in the reverse mode has its base grounded and its collector connected to the corresponding solenoid valve. The emitter of transistor 168 is connected to the 5-volt supply through a resistor 170 and to the input of an inverter 172 through a diode 174 and series connected resistors 176 and 178. A pull-up resistor 180, connected in parallel with a capacitor 182, is connected between the 5-volt supply and the resistors 176 and 178. The outputs of the inverters 172 of the six circuits 166 are connected to inputs PB0-PB5 of the ROM-I/O Expander 106 (FIG. 2b).

As a solenoid is pulsed on and off by the driver circuit, a negative flyback voltage is produced at the collector of the transistor 168 causing current to flow from the emitter to the collector. Current flows through the resistor 176 and the diode 174 charging capacitor 182 to about 5 volts which places a low logic level at the input of the inverter 172. The resistance of the resistor 180 is much greater than the resistance of resistor 176, and when pulses stop, resistor 180 discharges the capacitor 182. If a solenoid or a wiring harness to the solenoid is open- or short-circuited, no flyback voltage will appear at the collector of the transistor 168 and a low rather than a high voltage will appear at the corresponding input to the circuit 106. By selectively pushing the solenoids and checking for the flyback voltages, bad solenoid valves or a defective wiring harness can be located immediately. Each time a solenoid valve is activated during normal operation, if the processor checks the corresponding solenoid check circuit output and the proper voltage is not detected, a problem is indicated. If the problem lasts for more than a predetermined time period (preferably about 0.4 seconds) a register in the processor is set to indicate a problem mode, described in detail below.

Connected to terminals PA0–PA3 of the ROM-I/O Expander 106 are terminals A0–A3, respectively, of a BCD to 7-segment display decoder driver 190, which in the preferred embodiment is a Fairchild 9374 integrated circuit. The outputs $\overline{A}$–$\overline{G}$ of the circuit 190 are connected to a 7-segment readout 192 on the gear display 46. The display 46 provides an indication of the gear ratio of the transmission. In addition, when the selector is placed in "neutral", the readout 192 flashes sequentially the gear ratios that are still available if a defective wiring harness or one or more defective solenoids are detected by the circuits 166. A second readout 194 is connected through a conventional current limited driver circuit 196 to the output PA4 of the circuit 106 and is activated with the torque converter solenoid SV4 to indicate that the torque converter lockup clutch is engaged.

A mode selector switch 200 is connected via a resistor 202 to terminal PA7 of the circuit 106. When the switch 200 is in the "auto" position, the terminal is held at a "high" level by the 5-volt supply connected to the resistor 202 by a pull-up resistor 204. When the switch is in the "manual" position, the PA7 terminal is held at a "low" level. With the switch in the "manual" position, the gear ratio of the transmission is selected directly according to the position of the shift lever. When the switch is in the "auto" position, neutral, reverse and first gear are directly selected by the shift lever, but above first gear the position of the shift lever merely determines the maximum gear ratio, and shifting between gear ratios occurs automatically under control of the microprocessor as discussed in detail below. An indicator light 205 located on the instrument panel is illuminated when switch 200 is in the "auto" position.

Terminal PB6 is connected through resistors 206 and 208 to the 5-volt supply. A transport-loading switch 209 on the elevator control grounds the junction between the resistors 206 and 208 to provide a "low" level at the terminal PB6 when the elevator is in operation. When the elevator is not loading, the switch is opened and a "high" level appears at the terminal. During the loading mode (i.e., PB6 is "low"), the torque converter is unlocked so that sufficient engine speed will be maintained, even under heavy loading, to supply enough hydraulic pressure to operate the elevator. The processor is programmed to check the terminal PB6 and allow torque converter lockup (i.e., activation of SV4) only when the "high" level is present, that is, when switch 209 is in the "T" position.

Terminal PB7 is connected through resistors 210 and 212 to the 5-volt supply. The switch 44 on the throttle 45 grounds the junction between the resistors and presents a "low" level at the terminal PB7 when the throttle is below a pre-selected position, preferably about the half-throttle position, indicating that the vehicle is to be decelerated. Above the pre-selected position (half throttle to full throttle), the switch is open, allowing the terminal PB7 to go to the "high" level. During the transport mode (i.e., PB6 is at the "high" level) the processor checks the state of the terminal PB8. During part throttle transport operation (PB7 is "low"), the torque converter is locked up in fourth through sixth gears, and there is direct drive between the engine and drive wheels so that the engine can be more effectively utilized for braking. At full throttle, while switch 200 is in the "auto" position, the processor activates SV4 and locks up the torque converter during the upper range of speeds of each of the gears from fourth through sixth.

For third gear and below in the preferred embodiment, the solenoid SV4 is normally deactivated so the torque converter remains unlocked except when third gear is selected by the gear shift lever.

A comparator 220 (FIG. 2a) has a positive input connected through a resistor 222 to a terminal 224 of a voltage divider circuit 226 connected between ground and the nominal 24-volt supply. The negative input of the comparator is connected to a source of reference potential which in the preferred embodiment is the 4.7-volt supply. The comparator output is normally "high" unless the nominal 24-volt supply voltage drops below about 18 volts at which time current is drawn through diode 228 and resistor 230 to drain capacitor 232 which otherwise is charged to about 5 volts by resistor 234. The "low" level at the capacitor 232 connected to NAND gate 236 forces the output of the gate to "high", which in turn forces the output of NAND gate 238 connected to the $\overline{\text{RESET}}$ terminal to "low" causing the processor 100 to reset.

A comparator 240 for solenoid valve duty cycle determination dependent on the actual voltage of the nominal 24-volt supply includes a negative input connected to a refernce voltage, which in FIG. 2a is shown as the 4.7-volt supply. The positive input is connected through a resistor 242 to terminal 244 of a voltage divider 246 connected between ground and the 24-volt supply. When the actual supply voltage is above a pre-selected voltage of approximately 24 volts, the voltage level at the positive input is higher than the reference level and output 250 of the comparator 240 remains "high". If the supply voltage drops below the pre-selected level, the voltage level at the positive input falls below the reference voltage forcing the output 250 "low". The output 250 is connected via line 252 to terminal PA6 of the expander 106. The state of the terminal PA6 determines the duty cycle of the solenoid drivers 110–120. If the level is "high" indicating that the supply voltage is above the pre-selected level of about 24 volts, the drivers are pulsed at a first duty cycle, preferably 33 percent, which is sufficient to maintain the solenoid valves activated without overheating. If the supply voltage drops below the pre-selected level, the duty cycle is increased to 50 percent. Pulse duration is chosen at 1.2 milliseconds with the time between pulses being 1.2 milliseconds or 2.4 milliseconds depending on the state of terminal PA6. The microprocessor is programmed to perform a timer-interrupt every 1.2 milliseconds and to pulse the selected solenoid valves for 1.2 milliseconds every third time through the timer interrupt if PA6 is "high" or every 2.4 milliseconds if PA6 is "low". The duty cycle chosen is dependent upon the rated voltage of the solenoid valves, the supply voltage, and the expected deviation in the supply voltage. With a nominal supply voltage of 24 volts, the actual voltage of the supply varies typically between 18 and 32 volts. The predetermined voltage at which the duty cycle is selected to change is in the range of 21 to 24 volts.

A processor monitoring circuit 260 (FIG. 2a) is connected between terminals P16 and ALE, and the $\overline{\text{RESET}}$ terminal to monitor operation of the processor 100. If the processor gets hung up or lost in its routine, the circuit 260 resets the processor to give it the opportunity to restart the routine. The output of the terminal ALE, a 400 khz clock pulse, is applied through a comparator 262 to the clock input of a 12-bit binary counter 264. During normal operation of the processor 100, software control causes a series of pulses at terminal P16 which are applied through a comparator 266 to a high pass RC filter 268 to the reset input of the counter 264. During normal operation, a series of spikes appear at the reset input so that the counter is reset and outputs Q8 and Q12 remain low. If a malfunction occurs as the processor goes through its program, the pulses necessary to reset the counter do not appear at the terminal P16 and the counter counts up until a positive output appears at the output terminals which are connected to a NAND gate 270. When the count causes the outputs to go "high" the NAND gate output goes "low", forcing the output of the NAND gate 236 "high" which results in a processor $\overline{\text{RESET}}$ signal at the output of the NAND gate 238. Without a reset signal at the counter 264, the outputs Q8 and Q12 will contiue to alternately clock "high" and "low". While clocking "low" the $\overline{\text{RESET}}$ signal disappears to give the processor the opportunity to begin running again. If normal operation is resumed, pulses will appear at terminal P16 to prevent the counter 264 from counting up to an output on Q8 and Q12.

A switch 280 of the hold shift control 40 is connected through a resistor 282 to the T1 terminal of the processor 100. A resistor 284 connected to the 5-volt supply and the resistor 282 maintains the terminal "high" except when the hold switch 280 is closed by the operator. When the switch is closed, T1 goes "low", and the processor prevents a gear change from occurring while the control 26 is in the automatic mode. The hold shift control 40 is used to prevent unwanted shifting that sometimes occurs during loading, when operating in poor tractive conditions where excessive wheel slip might occur, or while turning. The hold control 40 also holds the torque converter lockup clutch CT, controlled by SV4, as it was when the switch 280 was closed.

A reverse warning indicator 286 (FIG. 2b) is connected to terminal PA5 of the expander 106. When reverse gear is selected, PA5 is switched from "low" to "high" to activate the indicator 286 which may be a horn or other warning device.

SHIFTING MODES

The controller 26 provides both an automatic and a manual mode of operation. These are selected by the vehicle operator using the two-position toggle switch 200 (FIG. 2b) of the mode control 38 located on the control 26. In the manual mode, the control 26 utilizes signals from the pickup 42 and the shift control 36. In the automatic mode, the control utilizes the pickup and shift control signals as well as input signals from the throttle position switch 44, the elevator switch 209 and the hold shift switch 280.

The switch 200 selects whether the shift signal provided at terminals P10–P15 of the processor 100 is to be determined manually or automatically. The processor takes the signal for the gear selected and energizes the proper solenoid drivers 110-120 for that gear.

When operating in the manual mode, the gear is selected directly by the shift control 36. The speed signal from the magnetic pickup 42 and the pulse shaper 80 are used to provide automatic control of the torque converter lockup clutch and downshift inhibit at higher speeds to help prevent engine overspeed.

When operating in the automatic mode, the top gear to which the transmission will shift is determined by the gearshift lever. For example, if the gear selector is in fifth gear, the transmission can shift to fifth and back down, but can go no higher than fifth gear. The torque converter 18 is also locked and unlocked automatically according to ground speed (FIG. 6) to achieve maximum performance.

Referring to FIG. 6, three different automatic shift patterns are programmed into the control 26. The transport pattern 300 (Transport-Full Throttle) is a shift sequence which starts in 3TC (third gear-torque converter drive) and then upshifts to 4TC, 4D (fourth gear-direct drive), 5TC, 5D, 6TC and 6D. Starting in 3TC provides smoother acceleration than if first and second gears were used.

The second pattern is the loading pattern 302. This pattern is automatically substituted for the transport mode whenever the elevator or material loading device on the vehicle is operating in a forward direction and is subject to heavy loading. The switch 209 (FIG. 2b) grounds the terminal PB6 of the expander 106 to select this pattern whenever the elevator is activated in the forward direction. The control 26 automatically shifts the transmission in gears first through sixth using torque converter drive only. Torque converter drive is used for the loading sequence because it provides maximum hydraulic power to the elevator, provides a drive variablity or cushion which is helpful for non-uniform materials, and reduces tire slippage so the operator can get full loads.

The third automatic pattern is the downshift pattern (Transport-Part Throttle) 304. This is selected automatically when the foot throttle 45 is released to decelerate the vehicle, thereby closing the switch 44 and grounding the terminal PB7 of the expander 106. This pattern provides engine braking by keeping the torque converter locked in sixth through fourth gears and by shifting at higher speeds so there is a higher engine RPM to ground speed ratio.

As is evident from FIG. 6, hysteresis is built into the three automatic shift patterns so that the upshift speed to a higher gear is greater than the downshift speed from that gear. For example, upshift from 4TC to 5TC indicated at 306 in the loading mode occurs at approximately 6½ miles per hour while downshift to 4TC from 5TC, shown at 308, occurs at about 5 miles per hour. This feature helps prevent the transmission from hunting from gear to gear.

In addition to hysteresis, two features are built into the control 26 to provide smooth operation. First, a three second delay between shifts prevents quick shifting back and forth between two gears. Second, the control checks acceleration following the time delay after an upshift and prevents a downshift if the vehicle is accelerating, even if the vehicle speed is below the downshift speed. Often, an upshift causes the vehicle to temporarily slow below the downshift speed but by checking for an acceleration signal, the control 26 prevents needless downshifting if the signal indicates that the vehicle is speeding up. Regardless of the vehicle speed, no downshift will occur if there is acceleration following the time delay after an upshift.

A downshift inhibit function is programmed into the control 26 which works in both the automatic mode and the manual mode to prevent an engine-damaging forced downshift to occur in third through fifth gears when the engine speed is above a pre-selected speed, preferably about 2350 RPM. However, first gear, neutral and reverse are manually selectable at all times allowing the operator to override the control 26, if necessary.

If the magnetic pickup 42 or the wiring and circuitry associated with the pickup should fail, a sudden loss of speed signal can occur which, during the automatic mode, could cause an immediate downshift to the lowest gear for that mode. To prevent sudden downshift if the speed signal is lost, the control is programmed to downshift the transmission one gear at a time with a 5-second delay between shifts. This allows the vehicle to decelerate gradually and prevents damaging overloads to the transmission and engine.

DIAGNOSTICS

The control 26 is programmed to check the wiring from the controller to the transmission solenoids SV1–SV6 as well as the solenoids themselves. The control 26 automatically checks all solenoids and leads to the solenoids for short- or open-circuits whenever the engine on the vehicle is started. The solenoid drivers 110–120 are selectively pulsed by the processor 100 which sends out pulses over terminals P10–P15. The check circuits 166 for the solenoids will detect a negative flyback voltage if the solenoid and wiring thereto are intact. If a problem is found, the gear display will flash in sequence the usable gears. FIG. 8 shows the sequential flashing which will occur on the digit 192 of the display 46 if a given valve or the lead thereto is defective. During operation, only the solenoids in use are checked prior to making each shift. When a malfunction occurs for more than a pre-selected time while operating in the automatic mode, any forward gear selection will result in the transmission shifting to fourth gear and the gear indicator flashing "4" on and off. If fourth gear is not available in the automatic mode, the transmission will shift to neutral and the display will flash "0" on and off. When the gear selector 36 is returned to neutral, a complete check of the solenoids is made and the gear display will flash in sequence the remaining usable gears. In the automatic mode, the only gear that is usable is fourth. In fourth, only one solenoid, SV3, is required (FIG. 7). However, in the manual mode all of the gears which are indicated to be good can be used. If a non-functional gear is selected in the manual mode, the transmission shifts to neutral and the display flashes "0" on and off. A flashing "L" indicates a failure in the lockup valve SV4 or its associated wiring. The built-in diagnostic procedure is helpful in quickly diagnosing broken wiring harnesses and failed solenoids. For example, if the gear indicator is flashing 3, 4, 6 repeatedly, the problem is with the number 5 solenoid valve or its wiring (FIG. 8).

MICROPROCESSOR CONTROL

Figure 9:
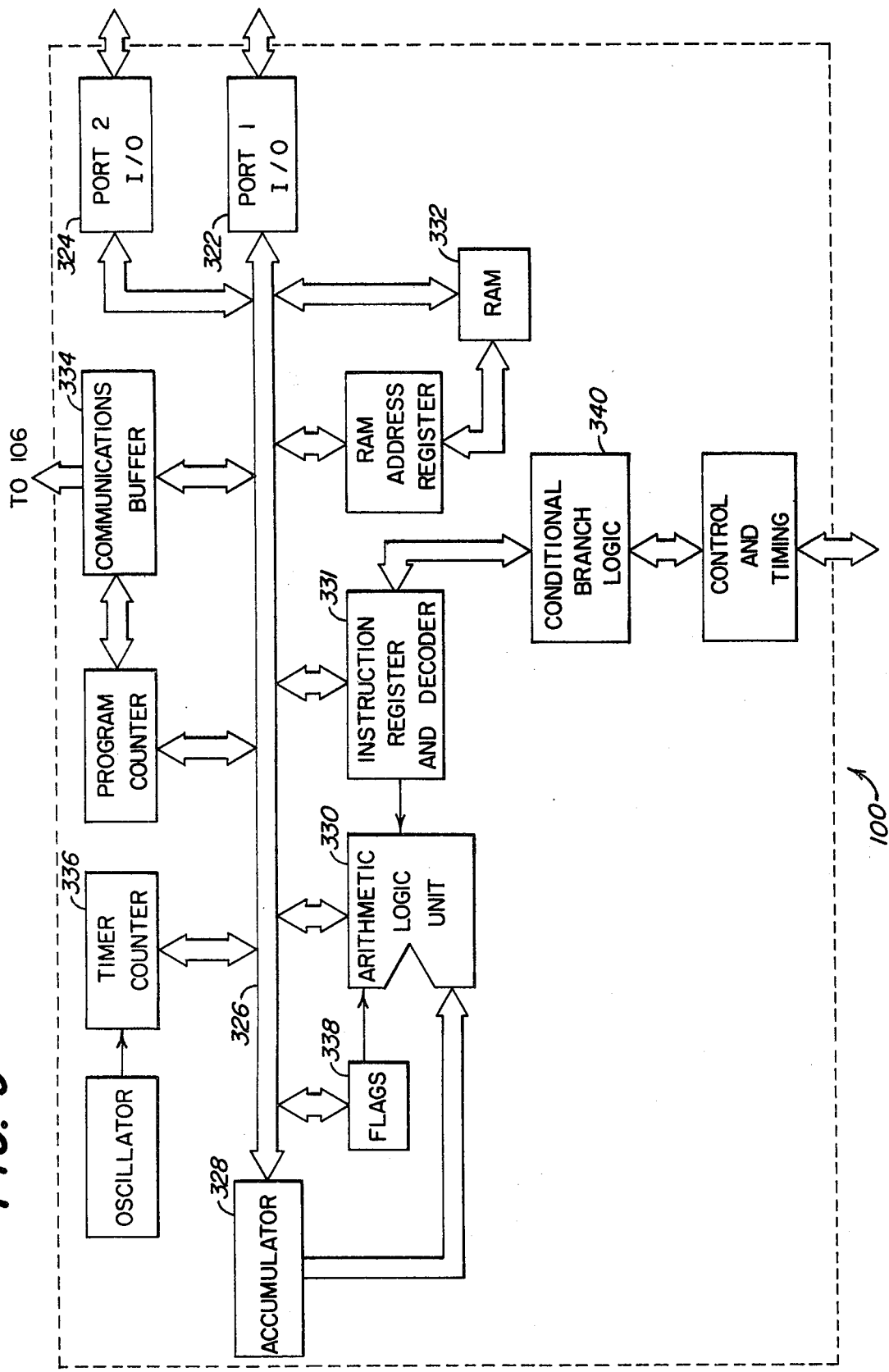

Since the processor 100 and the expander 106 are commercially available and well known to those skilled in the art, the details of these units will only be described briefly, followed by a comprehensive explanation of the program utilized to control the transmission operation. The processor 100 (FIG. 9) includes input/output lines grouped in two ports 322–324. Data is transferred over a bus 326 between the input/output ports and an 8-bit accumulator 328, which is the central point for most data transfers within the processor. An arithmetic logic unit 330 (ALU) accepts 8-bit data words and generates an 8-bit result under control of an instruction decoder 331.

A random access memory (RAM) 332 is connected through the bus 326 to the accumulator 328. The RAM 322 includes two banks of working registers R0–R7 and R0'–R7'. Data can be transferred directly between the accumulator and the working registers. The remaining memory is addressed indirectly by an address stored in the R0 or R1 registers. The working registers R0–R7 can also be loaded from a program memory in the expander 106 via a communications buffer 334. The memory, a read only memory (ROM) which is mask programmable, includes valve combinations and gear display outputs for each gear state. Shift speed indications for upshift and downshift points for several shift patterns are also stored in the memory as well as indications for torque converter locking and unlocking points.

Data can be transferred between the accumulator 328 and a timer/counter 336 via bus 326. The timer/counter includes an 8-bit register. In the preferred embodiment, a 6 MHZ crystal oscillator 102 (FIG. 2a) provides a frequency reference for the timer/counter.

Two flags 338 are also provided, and FLAG 1 is used to indicate downshift sequence status as described below. Conditional branch logic 340 enables several conditions, including the states of inputs T1 and $\overline{INT}$ and FLAG 1 to be tested by the program.

Figure 10:
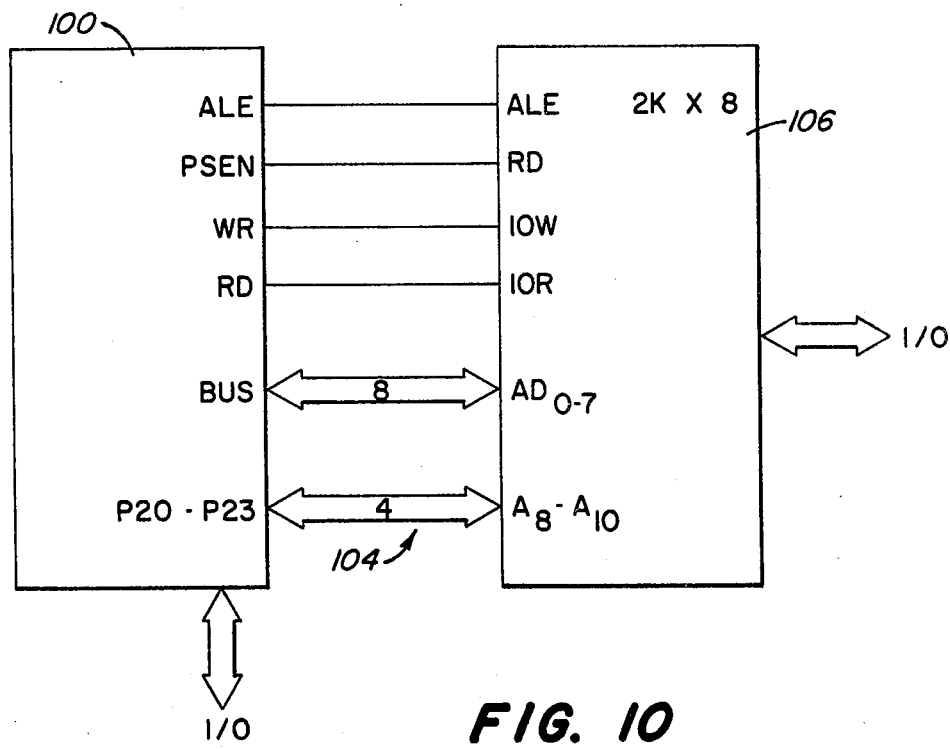
FIG. 10 is a block diagram showing the ROM and I/O expander connected to the microprocessor of FIG. 9.

FIG. 10 shows a block diagram of the expander 106 as it is connected to the processor 100. Program memory is accessed by applying 11 bits of address to the AD0–A10 inputs. While ALE is high the AD0–A10 inputs are allowed into the expander and when ALE is low, these inputs are latched. A low level on $\overline{RD}$ will cause the data to be outputted on the data bus. For a detailed description of the construction and operation of the microprocessor 100 and the expander 106, see the aforementioned *User's Manual*.

Within the RAM 332 are the following 8-bit registers: GEARSTATE-identifies the current state of the transmission and torque converter lockup clutch; GEARSPEED-identifies the transmission gear state which is being requested by the vehicle ground speed; LASTSHIFT-indicates whether previous shift transition was upshift or downshift and also stores the valve under test. One of the working registers is used to store the accumulator contents during timer or external interrupts. In addition, six working registers store delay information for shift, shift lever, downshift sequence, coil check, display flash and acceleration check delays.

Other registers in the RAM 332 include: LEVER—position of the gear selector lever; PREVIOUS GEAR STATE—same as GEARSTATE; TCSPEED—same as GEARSPEED except it also includes the requested state of the torque converter; BADGEAR—indicates which gears are diagnosed as non-functional; PROBLEM—indicates when a solenoid coil failure has been diagnosed; ATIME—average time required to accumulate the pre-selected number of mag pickup pulses (1 bit=1.2 msec); TIME—the current accumulation of time for the pre-selected number of mag pickup pulses; ACCELERATION—indicates when speed is increasing; SOLENOID VALVE TEST—indicates when coil test is in progress; VALVE—indicates the combination of valves required to obtain the current transmission and torque converter lockup states required (each of the first six bits of the register correspond to one of the solenoid valves SV1–SV6); PULSE COUNTER—register for counting mag pickup pulses which counts pulses until a new speed is computed at which point it is reset to zero.

Figure 5A:
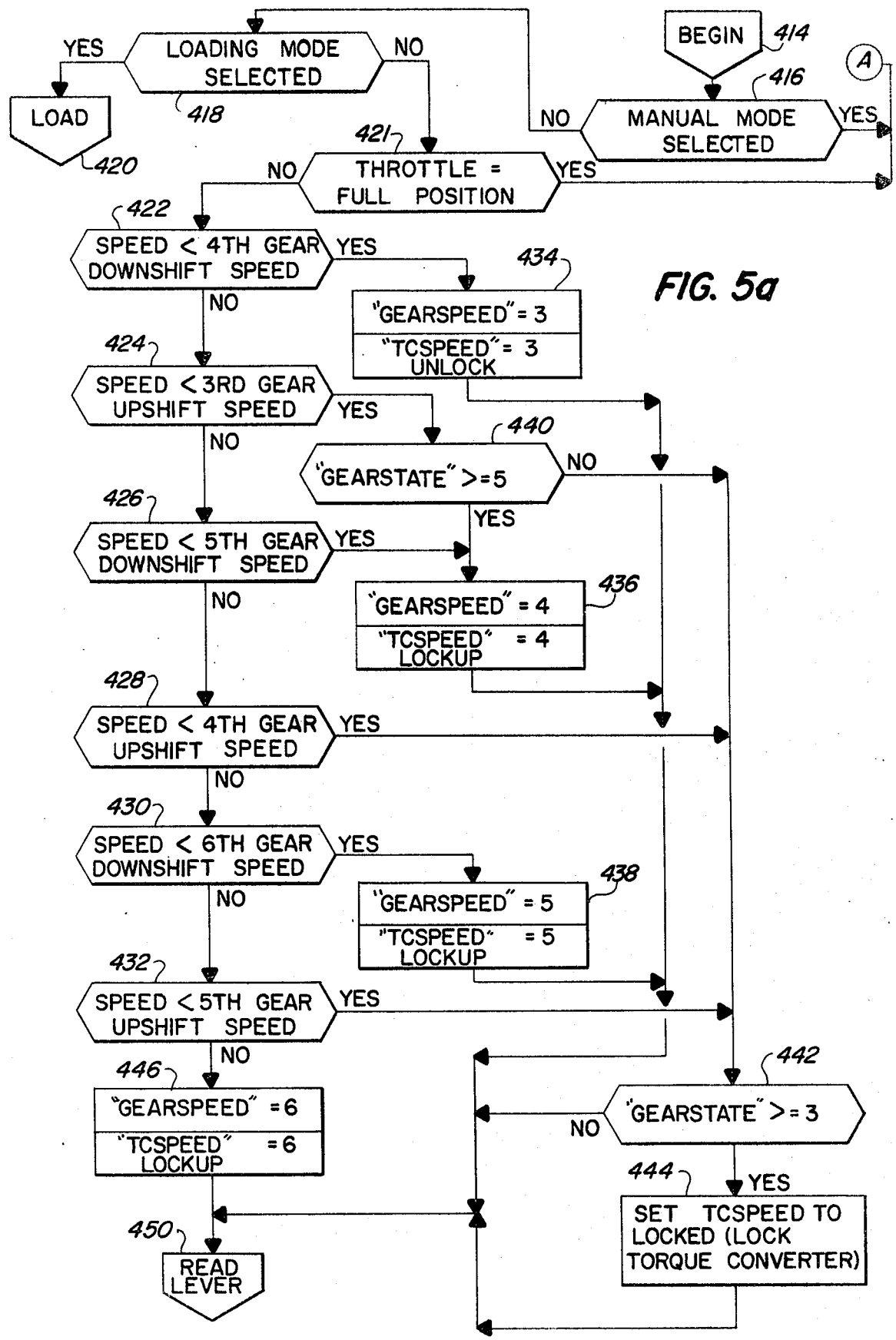
FIGS. 5a-5o is a flow chart of illustrative processing in accordance with the present invention.
Figure 5B:
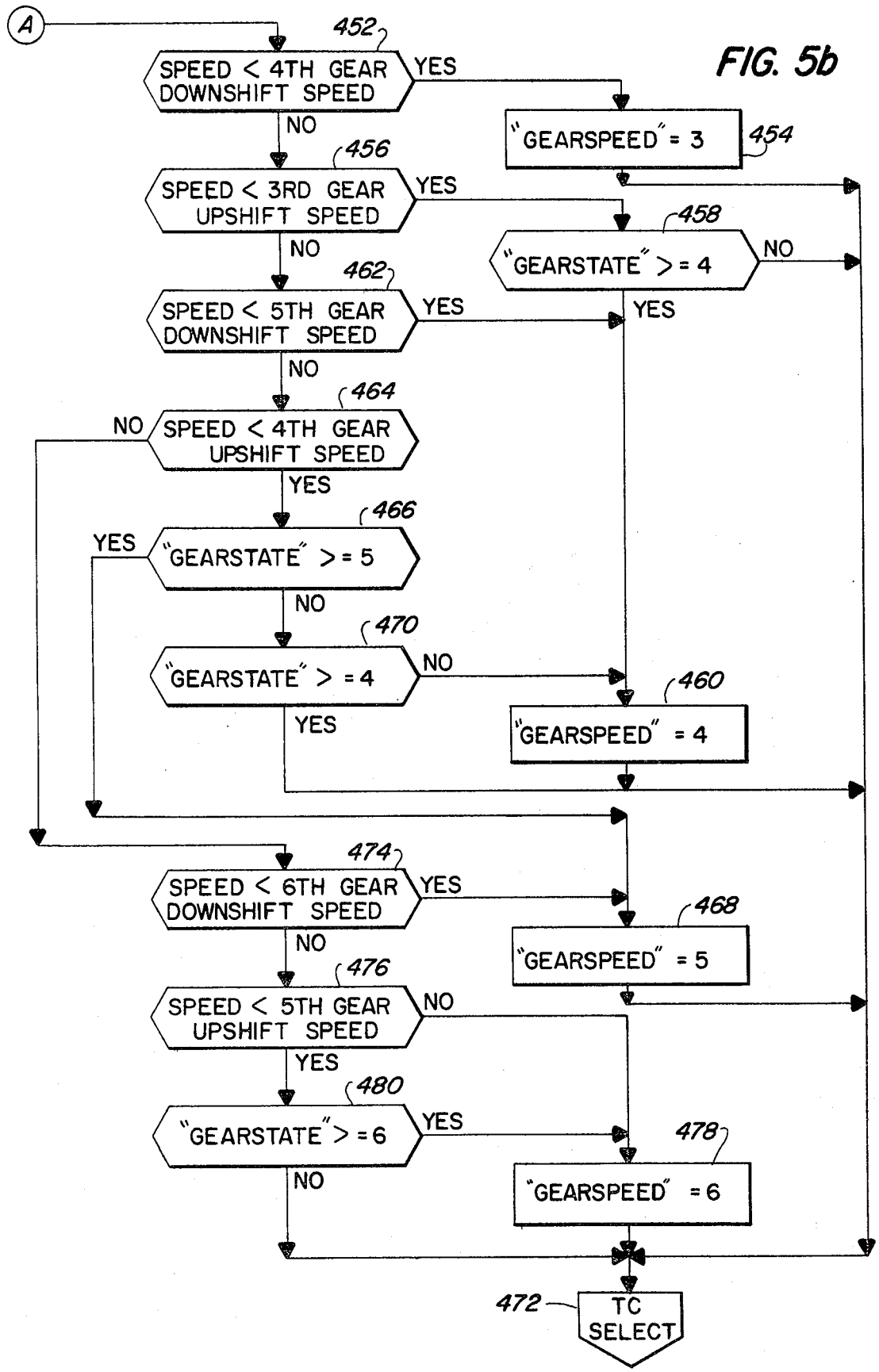
Figure 5C:
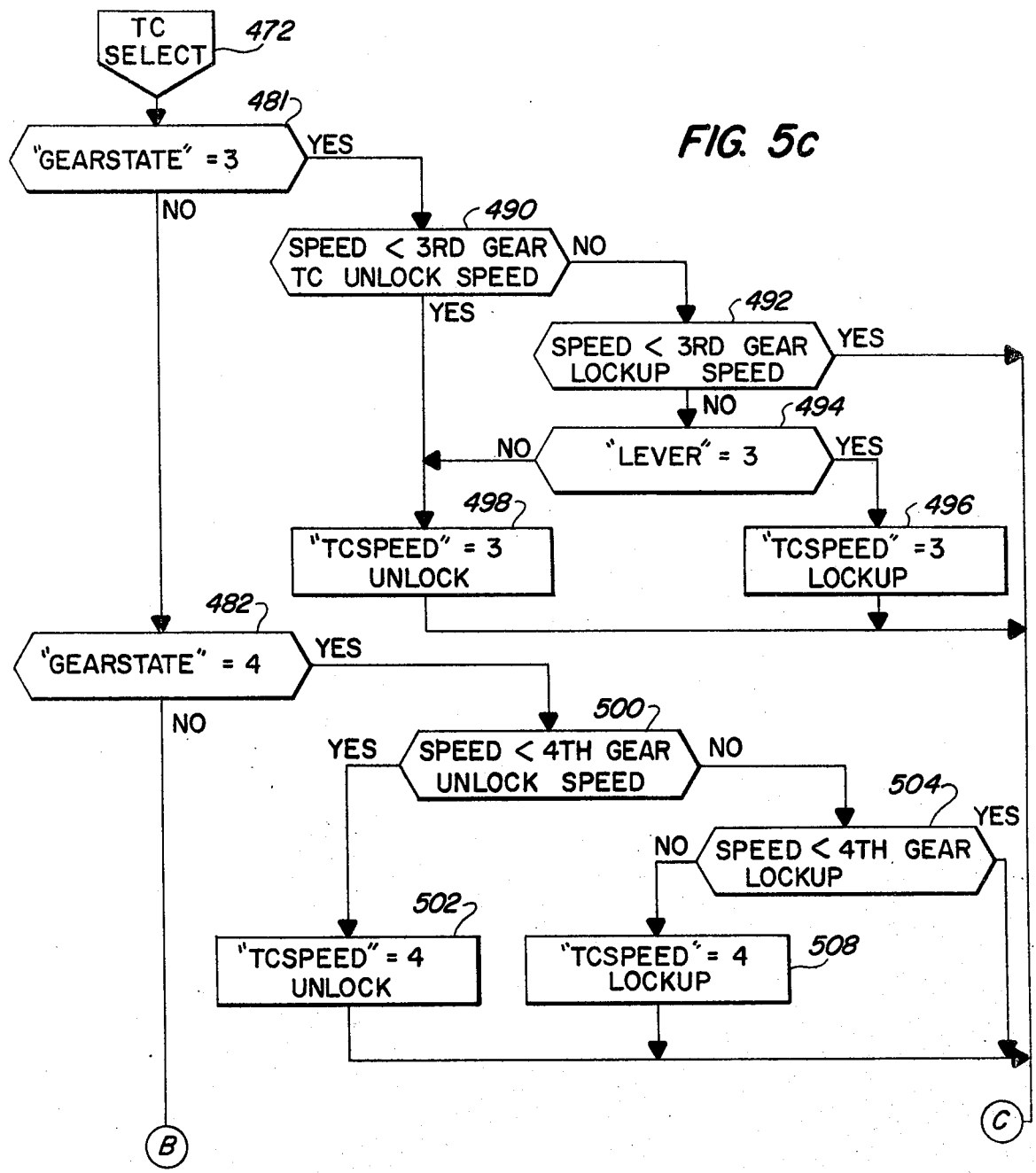
Figure 5D:
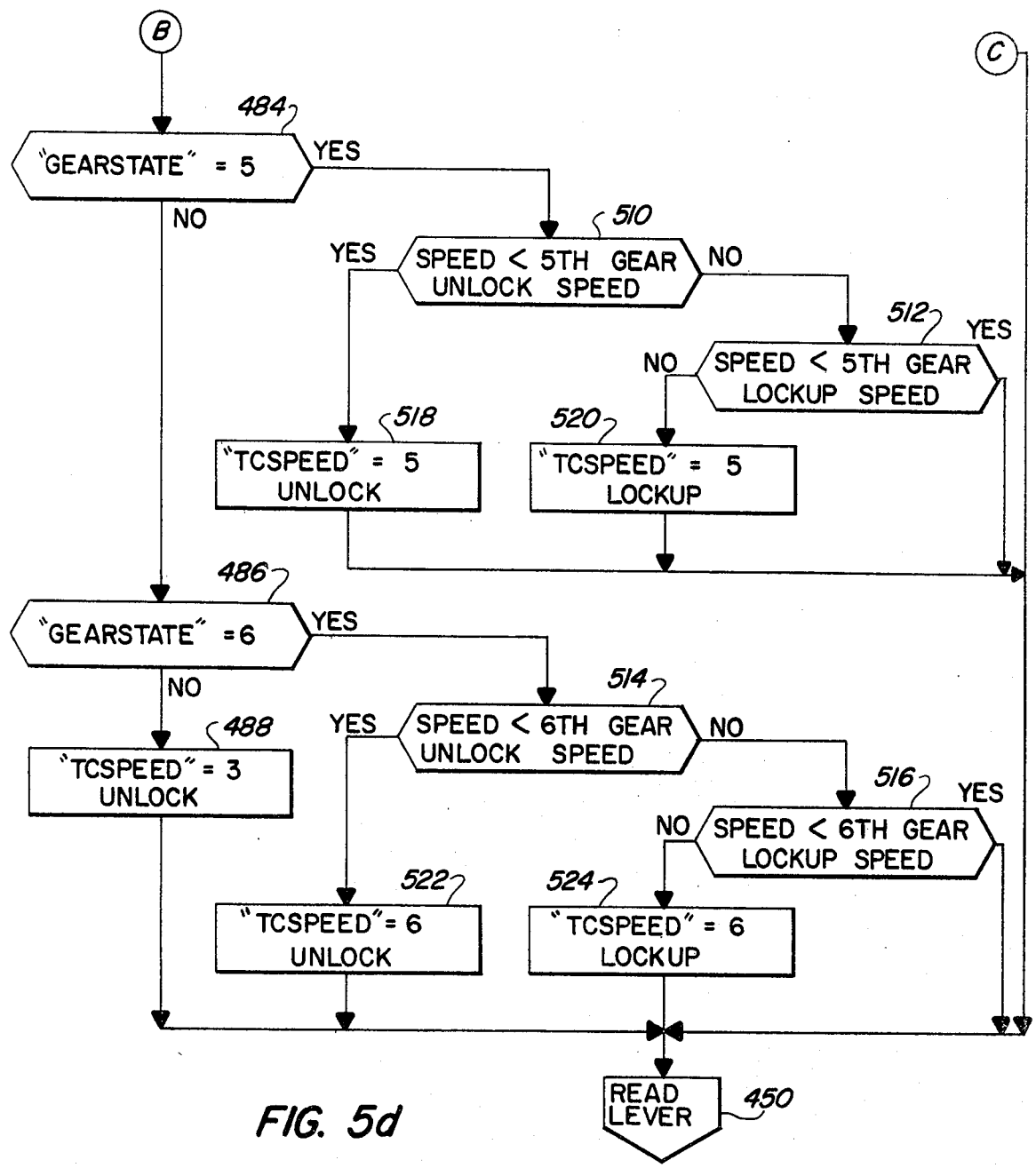
Figure 5F:
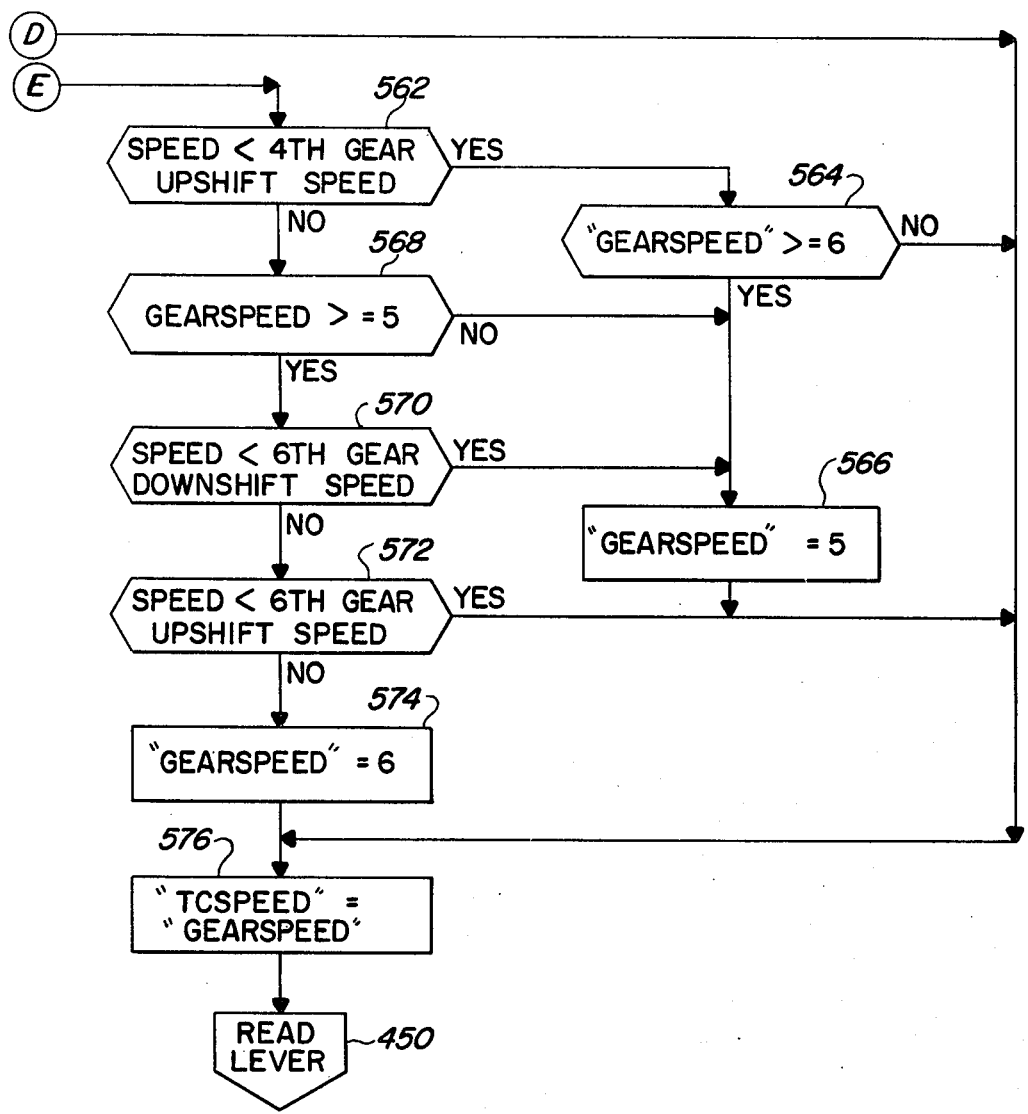
Figure 5G:
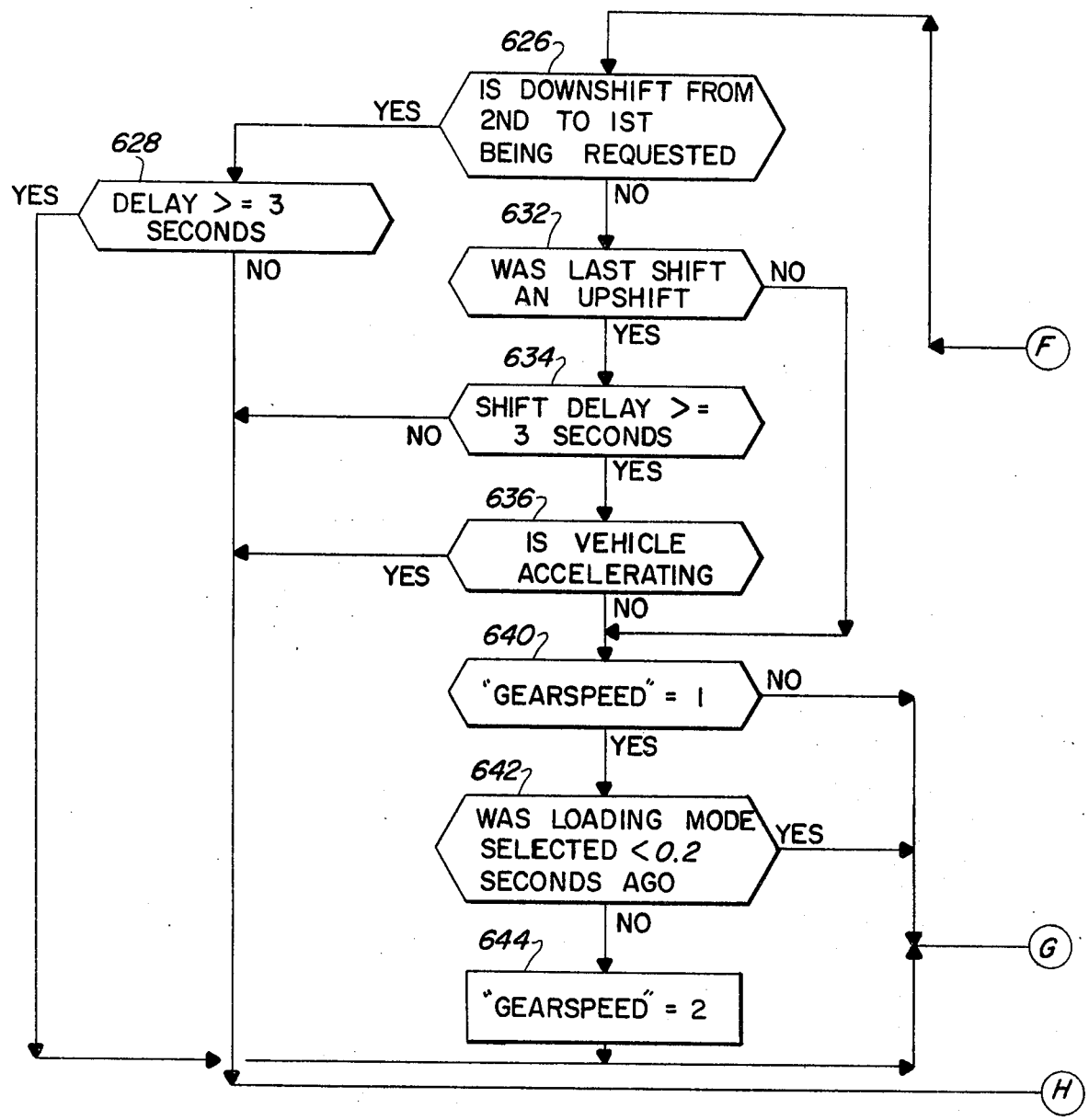
Figure 5I:
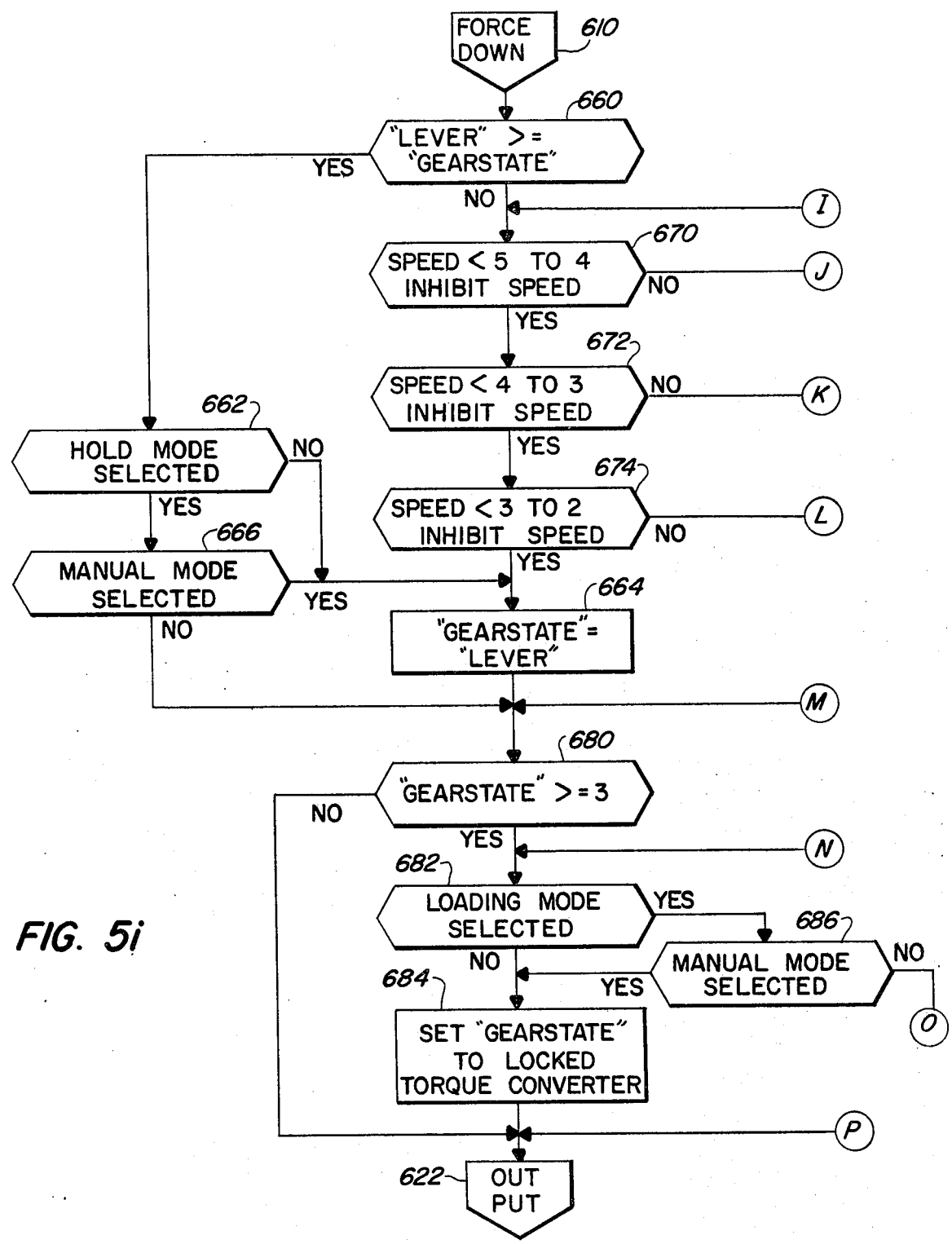
Figure 5J:
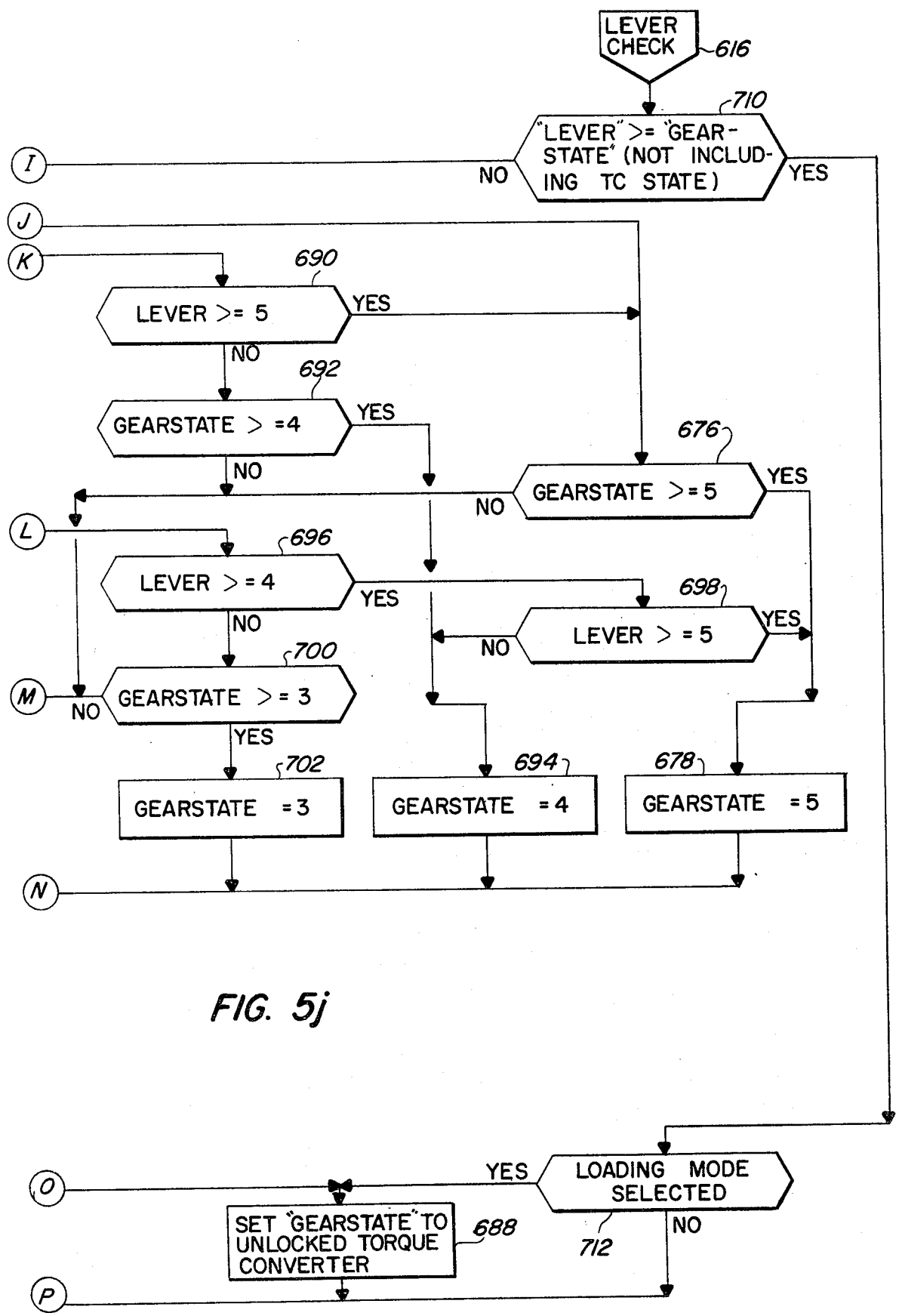
Figure 5K:
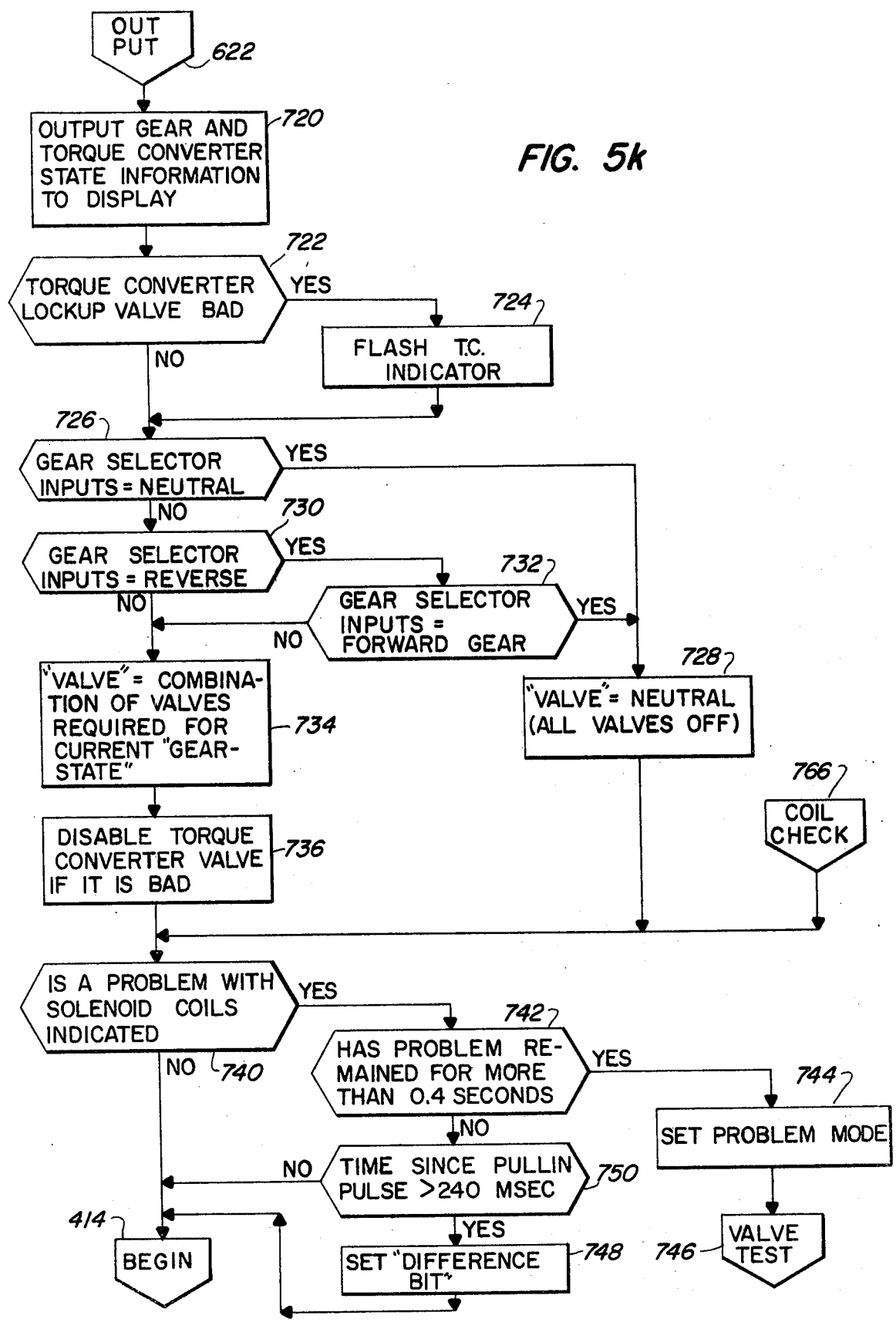
Figure 5L:
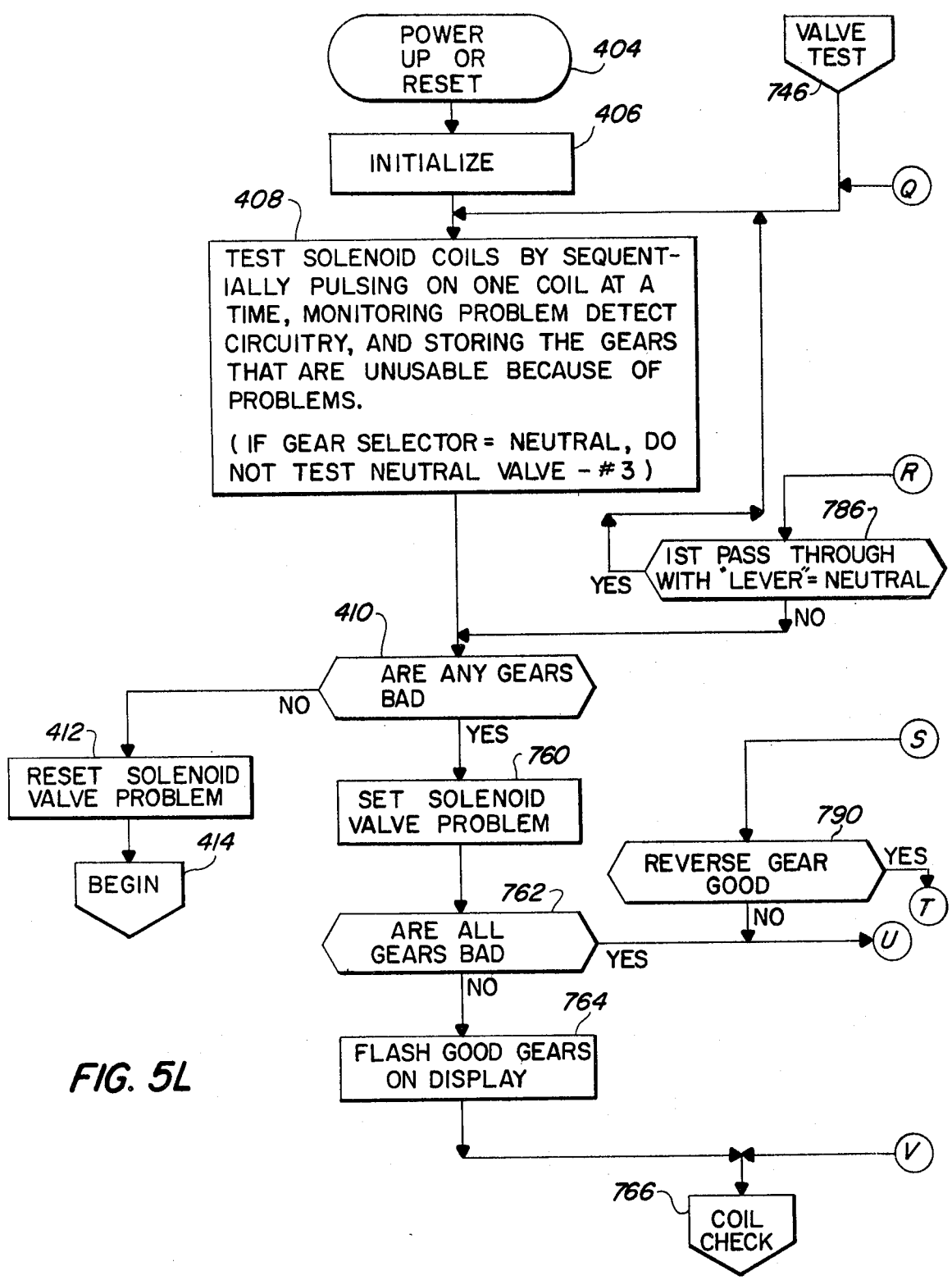
Figure 5M:
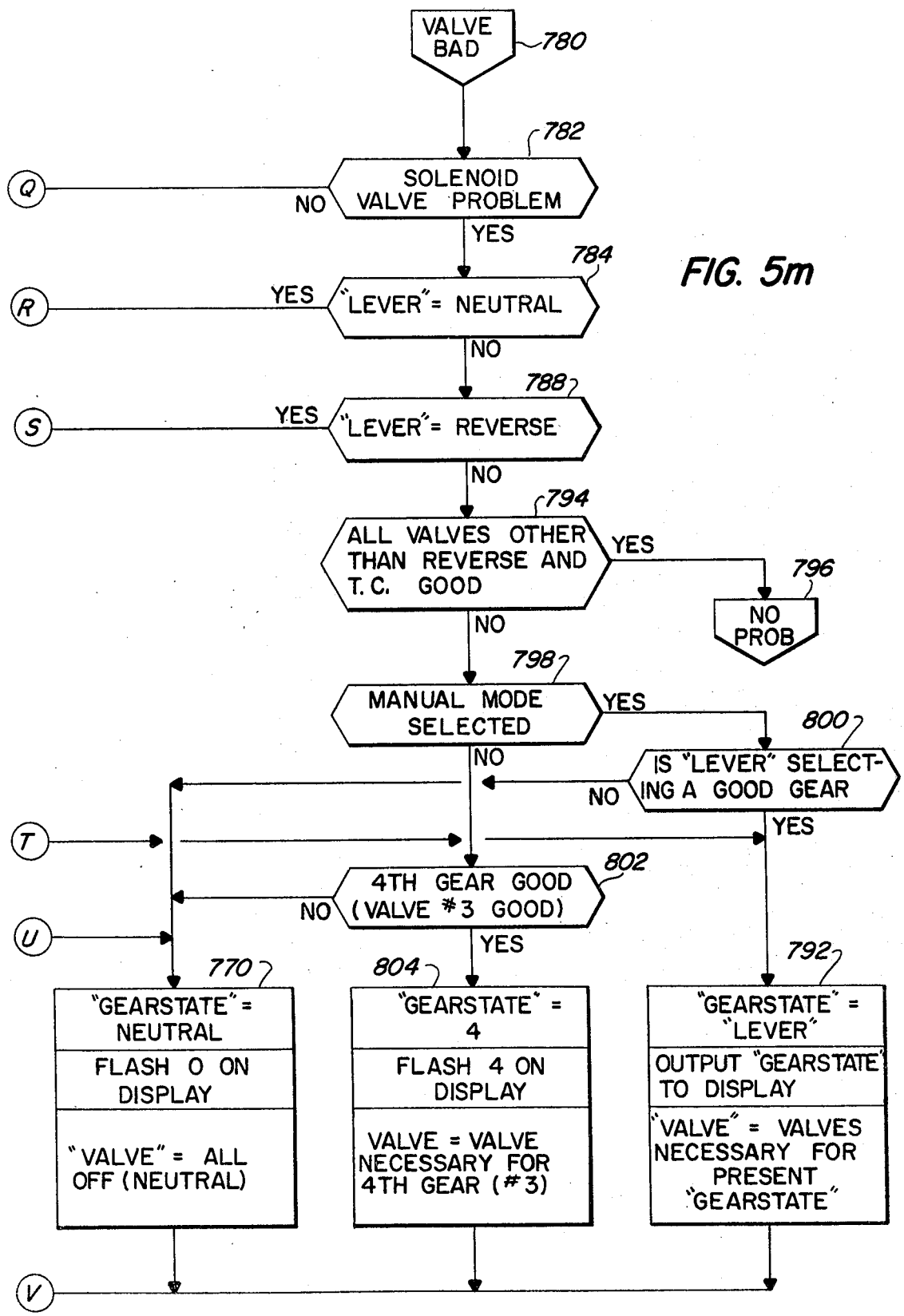
Figure 5N:
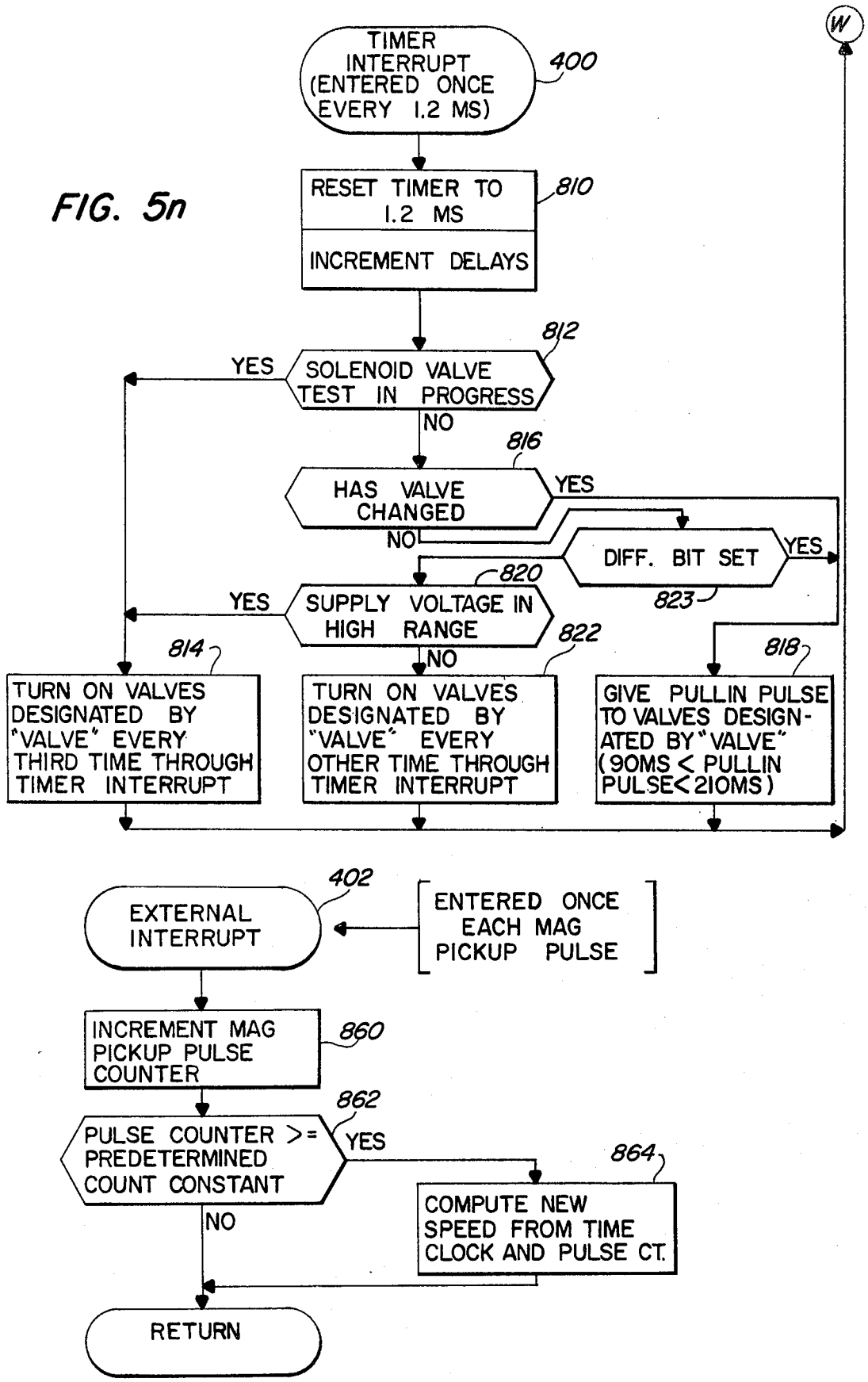
Figure 5O:
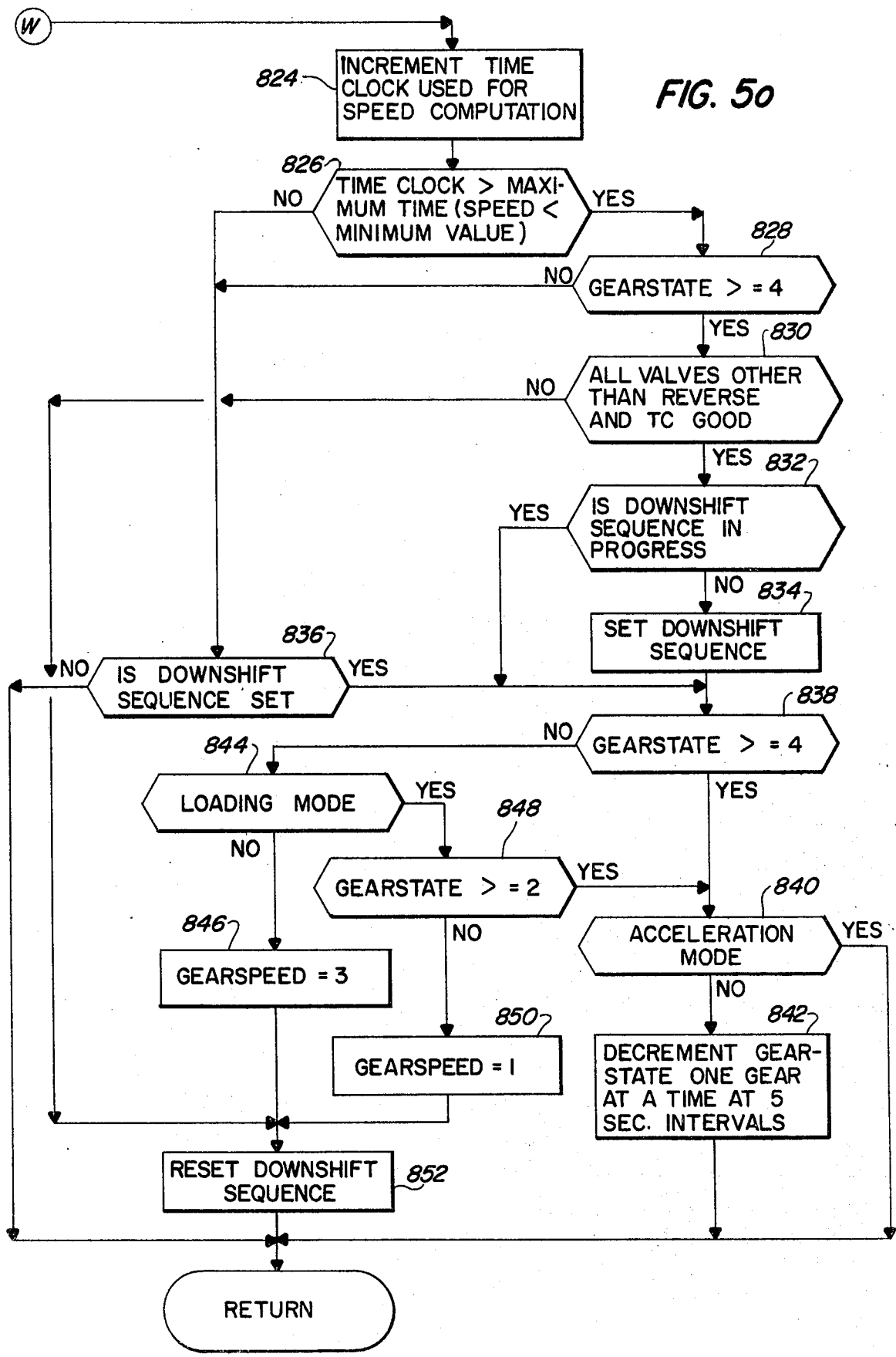

Referring now to FIGS. 5a–5o, the flow chart for the main body of the program is shown along with two special routines, the external and timer interrupts (FIGS. 5n–5o). The external interrupt 402 is a routine that interrupts the main body of the program once for every mag pickup pulse from the pickup 42. The timer interrupt 400 is a routine that interrupts the main body of the program once every 1.2 msec and it provides the basis for the timing functions. Upon completion of either of the interrupt routines the program flow continues from the point of interruption of the main body of the program.

Referring now to FIGS. 5a and 5l, upon power-up (404) of the circuit 100 or after a reset signal is applied thereto, the registers are initialized (406). The timer is set for 1.2 msec and the GEARSTATE, GEARSPEED and LEVER registers are set to indicate neutral, and the timer is started. The SOLENOID VALVE TEST register is set to indicate a coil test is in progress, (408). An INDEX register in the RAM 332 is set to 6 and is decremented each time any one of the solenoids is activated by providing a pulse on one of the terminals P10–P15. If no negative flyback voltage is detected by the solenoid check-circuit 166 for the valve pulsed, a corresponding bit in the BADGEAR register is changed to indicate that the gear utilizing that solenoid is non-functional. The neutral valve SV3 is not checked if the gear selector lever is in neutral since the switch 160 is open at that time and would cause an indication of a faulty solenoid valve. When the INDEX register is decremented to 0 and no bad gears are indicated at 410, the PROBLEM register is reset (412) and the program control shifts to the BEGIN routine 414 (FIG. 5a).

The terminal PA7 of the expander 106 is checked at 416 to determine if the switch 200 is in the automatic or manual position. If the automatic mode is indicated, the processor must determine which of the three automatic shift patterns of FIG. 6 is to be utilized. The terminal PB6 of expander 106 is checked to determine if the switch 209 is in the transport or the loading position. If the loading mode is selected (418) the program shifts to the LOAD routine 420 (5e). If the loading mode has not been selected, if the elevator switch is not in the forward on position, the processor then checks the state of the throttle position switch 44 by monitoring the terminal PB7 (421). If the throttle 45 is released so that it is below approximately half-throttle position, the part throttle transport patter 304 (FIG. 6) will be selected. The ground speed indication, computed from the external interrupt subroutine 402 (FIG. 5n) and entered into the ATIME register is first compared with the predetermined fourth gear downshift speed indication (422) which corresponds to location or shift point 422a on FIG. 6. The ground speed indication is compared in turn with each of the shift points 422a–432a (FIG. 6) until it is determined that the speed is less than the predetermined shift speed. If that speed is determined to be less than a particular downshift speed (422, 426 and 430) the GEARSPEED register is set to the state to identify the next lower gear. If that lower gear is fifth or fourth the TCSPEED register is set to lockup the torque converter solenoid valve (436 and 438). If the downshift is to third gear (434) TCSPEED is set to unlock the torque converter. If a third gear upshift speed is indicated, the GEARSTATE register is checked to see if fifth or sixth gear is indicated (440) and if so, GEARSPEED is set to fourth at 436. If the gearstate is below fifth at 440 it is again checked at 442 to see if it is greater than third and if so the TCSPEED register is set to lock the torque converter at 444. If the speed is less than the sixth gear downshift speed and greater than the fourth gear upshift speed, GEARSPEED is set to fifth and the TCSPEED register is set to indicate fifth gear torque converter lockup (438). If all the decisions are "no" in blocks 422 though 432, the GEARSPEED register is set to indicate sixth gear and the TCSPEED register is set to indicate sixth gear lockup at 446. After the portion of the part throttle routine is completed shown on FIG. 5a, control is shifted to the READ LEVER routine 450 (FIG. 5h).

Before describing the READ LEVER routine 450, the flow chart of FIG. 5b will be discussed. If either the state of the terminal PB7 or PB6 indicates that the transport mode shift pattern is to be utilized (421) or that the manual mode has been selected (416) and if the vehicle speed is less than the fourth gear downshift speed at 452, the GEARSPEED register is set to indicate third gear (454). When the speed is greater than the fourth gear downshift speed indicated at 452a on FIG. 6 but less than the third gear upshift speed (456 and 456a), the GEARSTATE register is checked to see if the present state of the transmission is fourth gear or above at 458 and if so, the GEARSPEED register is set to indicate fourth gear (460). When speed is between the fifth gear downshift speed (462a) and the third gear upshift speed (456a), the GEARPEED register is set to fourth at 460. If at 462 the speed is greater than the fifth gear downshift speed, the speed is then compared with the fourth gear upshift speed at 464. The GEARSTATE register is checked if the speed is below the fourth gear upshift speed and if GEARSTATE indicates the state of the transmission to be greater or equal than fifth gear (466), the GEARSPEED register is then set to fifth gear at 468. If the GEARSTATE register already indicates fourth gear at 470, control of the program is transferred to the TCSELECT routine 472. The GEARSPEED register is set to indicate fifth gear at 468, if at 466 the GEARSTATE register indicates fifth gear or above. If speed is above the fourth gear upshift speed but below the sixth gear downshift speed at 474, the GEARSPEED register is set to indicate fifth gear at 468. When the speed is above the fifth gear upshift speed (476a) and greater than the sixth gear downshift speed at 474a, the GEARSPEED register is set to indicate sixth gear at 478. If the speed at 476 is greater than the sixth gear downshift speed but less than the fifth gear upshift speed, and if the GEARSTATE register indicates that the current state of the transmission is sixth gear at 480, the GEARSPEED register is set to indicate sixth gear at 478. If the GEARSTATE register indicates at 480 that the current state of the transmission is less than sixth gear, control is shifted to the TCSELECT routine 472.

The TCSELECT routine 472 (FIG. 5c) sets the TCSPEED register for the proper condition of the torque converter lockup clutch in the manual and transport modes. The contents of the GEARSTATE register is checked to see if the indicated current state of the transmission is third, fourth, fifth, or sixth at 481–486, respectively. If none of the gears three through six are indicated, the TCSPEED register is set to indicate third gear with the torque converter unlocked at 488. When the present state of the transmission is third gear and the vehicle speed is below the third gear torque converter unlock speed (490) the TCSPEED register is set to indicate the third gear unlocked condition. If the speed is greater or equal to the third gear unlock speed and less than the third gear torque converter lockup speed (492), the TCSPEED register is left unchanged. If at 492 the speed is determined to be greater than or equal to the third gear lockup speed, the present position of the gear selector lever 53 is checked and if the lever is in the third gear position (494), the TCSPEED register is set to indicate third gear lockup at 496. If the shift lever is not in the third gear position, the TCSPEED register is set to third gear unlocked at 498.

Program flow is essentially the same if the GEARSTATE register indicates fourth, fifth, or sixth gears at 482, 484 and 486, respectively. If, for example at 482, the GEARSTATE register indicates that the current state of the transmission is fourth gear, the vehicle speed indication is compared with the indication of the fourth gear torque converter unlock speed (shown at 500a in FIG. 6) at 500. Then the TCSPEED register is set to indicate fourth gear with the torque converter unlocked at 502. If not, the vehicle speed is compared with the fourth gear torque converter lockup speed (504 of FIG. 5c and 504a of FIG. 6), and if the speed is less than the fourth gear lockup speed, control is shifted to the READ LEVER routine at 506. If not, the TCSPEED register is set to indicate fourth gear with the torque converter in the lockup condition at 508. Similarly, if the present state of the transmission as indicated by the GEARSTATE register is fifth or sixth, the ground speed is compared with the fifth gear unlock and lockup speeds (see 510a and 512a in FIG. 6) at 510 and 512, or the speed is compared with the sixth gear unlock speed and sixth lockup speed (514a and 516a) at 514 and 516, respectively. The TCSPEED register is then set to the proper GEARSTATE and lockup condition at 518-524. In essence, for a given GEARSTATE register indication, the speed indication is checked to determine whether ground speed is below the unlock speed, above the lockup speed, or between the two speeds, and then the TCSPEED register is set to indicate the unlocked condition of the torque converter if the speed is below the unlock speed or the lock condition if above the lockup speed, while no change is made if the speed is between the two points. If the GEARSTATE register indicates a third gear condition of the transmission (480), the TCSPEED register will request the torque converter lockup condition (496) only if the shift lever is in the third gear position (494).

Before discussion of the READ LEVER routine 450, the load routine 420 (5e) will be discussed in detail. Program control is shifted to the READ LEVER routine 450 after the LOAD routine 420. It should be noted here that the GEARSPEED and TCSPEED registers are loaded during these routines to indicate the state requested by the ground speed and the requested state of the torque converter prior to proceeding to the READ LEVER routine 450 whether the manual mode or one of the three automatic modes indicated in FIG. 6 is selected according to the flow chart of FIG. 5a.

IF the loading mode was selected at 418 (FIG. 5a), the speed indication is compared with the second gear downshift speed (see 530a in FIG. 6) at 530. If the speed is less than the downshift speed, the GEARSPEED register is set to indicate that first gear is requested at 532. If not, the speed is compared with the third gear downshift speed (534a) at 534 and if the speed is less than the downshift speed, the GEARSPEED register is checked at 536 to determine if the present state requested is third gear or above and if so, GEARSPEED is set for second gear at 538. If the GEARSPEED register already indicates the state requested by the ground speed is less than third gear, no change in the register is initiated at this point. When the ground speed is greater than or equal to the third gear downshift speed, the GEARSPEED register is then checked to see if the state indicated is greater or equal to second gear and if not, the register is set to indicate second gear at 538. If the state indicated by the GEARSPEED register is second or above, the ground speed is then compared with the fourth gear downshift speed (542a) at 542. If the ground speed is less than the fourth gear downshift speed and the GEARSPEED register indicates fourth gear or above (544), the register is then set to indicate third gear at 546. When the GEARSPEED register indicates less than fourth gear at 544, the contents of the register are left unchanged. A ground speed indication at 548 between the second gear upshift speed (548a of FIG. 6) and the fourth gear downshift speed (542a) is a condition, which as best seen in FIG. 6, can result in the transmission being in one of three gears. If the GEARSPEED register indicates fifth gear or above (550), then the GEARSPEED register is set to indicate fourth gear at 552. If GEARSPEED is already below fifth gear at 550, no change in the contents of the register is initiated. If the ground speed is not less than the second gear upshift speed (548a), the GEARSPEED register is checked to see if third gear or above is indicated at 554 and if not, GEARSPEED is set for third at 546. A gear greater than or equal to third at 554 causes the routine to check the ground speed against the third gear upshift speed (556a) at 556. If the speed is less than that shown in FIG. 6 at 556a, the GEARSPEED register is again checked at 550 to determine if fifth gear or above is indicated and if so, the register is set to indicate fourth gear at 552. When the ground speed is not less than the third gear upshift speed 556a, the GEARSPEED register is checked at 558 and if the gear indicated is less than fourth, the GEARSPEED register is set to indicate fourth at 552. If the GEARSPEED register already indicates fourth gear or above at 558, the ground speed is compared with the fifth gear downshift speed (308 in FIG. 6) and if the ground speed is less than the fifth gear downshift speed at 560, the GEARSPEED register is set to fourth gear at 552. When the ground speed is in the range between the fifth gear downshift speed 308 and the fourth gear upshift speed 306 (562), the GEARSPEED register is checked at 564. If sixth gear is indicated, the contents of the register are changed to indicate fifth gear at 566. GEARSPEED is checked at 568 if the ground speed at 562 is not below the fourth gear upshift speed. If the GEARSPEED register indicates less than fifth gear at 568, then it is reset to indicate fith gear at 566. If the GEARSPEED register already indicates fifth or sixth gear at 568, the ground speed of the vehicle is compared with the sixth gear downshift speed (570a) at 570, and if the speed is less than the downshift speed, the GEARSPEED register is set to indicate fifth gear at 566. If, however, the ground speed is below the sixth gear upshift speed (572a), no change in the state of the GEARSPEED register is required and control is switched to the READ LEVER routine 450. A ground speed at or above the sixth gear upshift speed (572a) causes the GEARSPEED register to be updated to indicate sixth gear at 574. The TCSPEED register is set equal to the GEARSPEED register at 576 before transferring control to the READ LEVER routine 450 to guarantee that the torque converter remains unlocked in the loading mode (since GEARSPEED does not contain the requested state of the torque converter).

Control is shifted to the READ LEVER routine 450 (FIG. 5h) after the TCSPEED and GEARSPEED registers have been set in the previously described routines for the desired mode of operation. The LEVER register is set to indicate the present gear selector position determined by the state of the inputs P24–P26 of the processor 100 (FIG. 2a) at 600. The PROBLEM register is checked to see if a solenoid coil failure has been diagnosed at 602. If no problem is indicated, the LEVER register is checked to see if the present gear selector position is second gear or above at 604. Since reverse, neutral and first gears are selected directly by the shift control 36, a "no" indication at 604 will set the GEARSTATE register directly to the gear indicated by the LEVER register (606). If the gear selector position is second gear or above (608), the LEVER and GEARSPEED registers are checked to determine if the position of the gear selector lever is greater or equal to the state requested by the ground speed of the vehicle, and if not, program control will shift to the FORCE DOWN routine 610 (FIG. 5i). If the shift lever is in second gear or higher and if the position of the lever is greater than or equal to the state requested by the ground speed (608), the state of the terminal PA7 of the expander 106 (FIG. 2b) is checked to see if the manual mode has been selected by the control 38 (612), and if so, the GEARSTATE register is set equal to the LEVER register (606). If the automatic mode is indicated at 612, the hold control 40 (FIG. 2a) is tested to see if the hold switch is engaged and if so, the program is shifted out of the READ LEVER routine 450 to the LEVER CHECK routine to prevent a gear change while the switch is engaged. If neither the manual mode nor the hold shift are indicated, the GEARSPEED and GEARSTATE registers are compared. If the state requested by the ground speed is the same as the current state of the transmission disregarding the state of the torque converter lockup clutch (616), the GEARSTATE and TCSPEED registers are compared (618). If the registers are equal (disregarding the state of the torque converter), the GEARSPEED register is set equal to the TCSPEED register and control is transferred to the OUTPUT routine 622. If the registers are different at 618, control is shifted directly to the OUTPUT routine 622 bypassing 620. The program flow is identical from the block 606 when the position of the shift lever is below second gear.

If at 616 the state requested by the ground speed is not equal to the current state of the transmission, the GEARSTATE and GEARSPEED registers are compared at 624. If the current state of the transmission is greater or equal to the state requested by the ground speed, the registers are checked at 626 (FIG. 5g) to determine if the downshift from second gear to first is being requested, that is, if GEARSPEED indicates first gear and GEARSTATE indicates second gear. Before a change in the GEARSTATE register is initialized, the time since the previous shift occurred must be greater or equal to three seconds (628). If not, control is shifted to the OUTPUT routine 622 and the GEARSTATE register remains unchanged during this cycle through the READ LEVER routine 450. Delay is determined by checking a delay register in the working registers of the RAM which is incremented during each timer-interrupt 400. If a delay of at least three seconds is determined at 628, the GEARSTATE register is set equal to the GEARSPEED register at 630 (FIG. 5h) and control is shifted to the OUTPUT routine 622.

If at 626 (FIG. 5g) a downshift from second to first is not being requested, the LASTSHIFT register is checked at 632 to determine if the previous shift transition was an upshift or a downshift and if an upshift is indicated, the shift delay register is checked at 634. If the three second delay has not occurred, control is shifted to the OUTPUT routine 622. If the shift delay is greater or equal to the pre-selected delay, the vehicle acceleration is checked at 636. To prevent a downshift after an upshift if the vehicle is accelerating, control is shifted directly to the OUTPUT routine 622 without resetting the GEARSTATE register. This feature in the program prevents a downshift regardless of how far below the downshift speed the vehicle speed is as long as the vehicle is accelerating. To determine if the vehicle is accelerating, ground speed is checked every ½ second. An acceleration mode status register in the RAM 332 is set to indicate that speed is increasing if the speed during the latest ½ second interval is greater than the speed indicated during the preceeding interval. An indication of speed increases at the acceleration mode status register causes the program to bypass the GEARSTATE register update at 630 so a downshift is prevented. The ½ second time delay is determined by the contents of an acceleration check delay register in the bank of working registers 333 of the RAM which is incremented during each pass through the timer-interrupt routine 400.

If the vehicle is not accelerating at 636 (FIG. 5g) or the last shift was not an upshift at 632, the state requested by the ground speed is checked at 640 to determine if first gear is requested. If first gear is not requested, the GEARSTATE register is set equal to the GEARSPEED register at 630 (FIG. 5h). If the state requested is first gear and the loading mode was selected within the last 0.2 seconds (642), the GEARSTATE register is also updated at 630. If the loading mode was not selected during the 0.2 seconds, GEARSPEED is set to indicate second gear (644) and GEARSTATE is updated to GEARSPEED at 630 before shifting control to the OUTPUT routine at 622.

Returning to block 624 of FIG. 5h, if the GEARSPEED register indicates that the state requested by the ground speed is greater than the current state of the transmission, the contents of the registers are checked to determine if an upshift from second to third gears is being requested at 650 and if so, the GEARSTATE register is updated at 630 provided the loading mode has not been selected (652). A second to third gear upshift delay of at least three seconds is provided at 654 if the loading mode has been selected. If other than a second gear upshift is requested at 650 the LASTSHIFT register is checked (656) and if the last shift was an upshift, the GEARSTATE register is updated at 630. If the last shift indicated at 656 was not an upshift, a delay of at least three seconds is provided at 658 before the GEARSTATE register is updated at 630.

Before discussion of the OUTPUT routine 622, the FORCE DOWN routine 610 (FIG. 5i) and the related LEVER CHECK routine 616 (FIG. 5j) will be discussed. Control of the program is shifted to the FORCE DOWN routine 610 if during the READ LEVER routine 450 the position of the gear shift lever is less than the transmission state requested by the ground speed (608). Note also that the LEVER CHECK routine 616 is selected at 614 if the hold switch is engaged to prevent a torque converter or transmission shift change.

In the FORCE DOWN routine 610, the position of the gear selector lever is first compared with the current state of the transmission at 660 and if the lever is above or equal to the current state and the hold mode is not selected (662), then the GEARSTATE register is set equal to the LEVER register at 664. If the hold mode and the manual mode are selected, the GEAR-STATE register is also updated at 664.

When the LEVER register indicates that the position of the gear selector lever is less than the gear indicated by the GEAR-STATE register, the current ground speed of the vehicle is compared with three pre-selected speeds corresponding to minimum downshift speeds above which it is undesirable to shift from fifth, fourth or third gears, respectively, because engine overspeed might result if the downshift occurred. If the ground speed of the vehicle is less than the three inhibit speeds, the GEARSTATE register is updated at 664. If, however, ground speed is not less than the fifth to fourth gear inhibit speed so that a downshift to fourth gear might cause engine overspeed, the GEARSTATE register is checked to see if fifth gear or above is indicated at 676 and if so, the register is updated to indicate fifth gear at 678. However, if the GEARSTATE is less than fifth gear at 676 and less than third gear (680), then the GEARSTATE register is left unchanged and control is shifted to the OUTPUT routine 622. If GEARSTATE indicates third or fourth gear (680) and the loading mode is not selected (682), the GEARSTATE register is then set so that torque converter lockup is requested at 684. If both the loading mode (682) and the manual mode (686) are selected, torque converter lockup is also requested at 684. The GEARSTATE register is set to indicate unlocked torque converter at 688 if the manual mode is not selected at 686.

If ground speed is not less than the fourth to third gear inhibit speed (672) and the position of the shift control lever is fifth or sixth gear (690), program flow is as previously described starting at block 676. However, if the lever is below the fifth gear position at 690 and the GEARSTATE register indicates fourth gear or above, then the register is set to fourth gear at 694. If the GEARSTATE register indicates less than fourth gear at 692 and less than third gear at 680, control is shifted to the OUTPUT routine 622. If third gear is indicated at 680, when the loading mode is checked at 682 and the previously described program flow is followed.

When the ground speed is not less than the third to second gear inhibit speed (674) and the gear shift lever is at fourth gear or above (696) but not in fifth or sixth gear (698), the GEARSTATE register is set to indicate fourth gear at 694. If the lever is in fifth gear or above (698), the GEARSTATE register is set to indicate fifth gear at 678. If the shift lever is below fourth gear (696) but is in third gear (700), the GEARSTATE register is set to indicate third gear at 702.

If the GEARSTATE register is set at 678, 694, or 702, the loading mode is then checked at 682 and the torque converter condition is set in the GEARSTATE register (684–688) as described above.

The LEVER CHECK routine 616 (FIG. 5j) first determines if the position of the gear selector lever is greater or equal to the gear indicated by the GEAR-STATE register contents disregarding the torque converter lockup information. If so and if the loading mode is selected (712), then the GEARSTATE register is set to indicate that the torque converter is unlocked (688). If the loading mode is not selected (712), control of the program is shifted to the OUTPUT routine 622. If at 710 the LEVER register indicates a gear lower than the GEARSTATE register, control is shifted to block 670 of the FORCE DOWN routine 610.

Referring now to FIG. 5k, the OUTPUT routine 622 will now be described. The state of the transmission and torque converter lockup clutch are displayed on the indicators 192 and 194 (FIG. 2b). A memory map is used in the microprocessor memory for storing valve combinations and gear display outputs for each gear state. The microprocessor program at 720 utilizes the GEARSTATE register information and the contents of the memory to selectively activate terminals PA0–PA4 of the expander 106. If the torque converter lockup valve has been found to be bad (bit 7 of the BADGEAR register) the torque converter lockup indicator 194 (FIG. 2b) is flashed (724) by pulsing terminal PA4 every half second. When no problem is indicated with the torque converter lockup valve at 722, terminals P24–P26 (FIG. 2a) are checked at 726. If the state of the terminals indicates that neutral has been selected by the gear shift lever, the VALVE register is set to indicate that all valves are "off" at 728. If the terminals P24–P26 indicate that reverse has been selected (730), the terminals are again checked to assure that no forward gear is also selected (732) before the VALVE register is set at 734. If both reverse and forward gears are indicated, which is not possible if the control is functioning properly, the VALVE register is set to neutral at 728. Otherwise the VALVE register is updated with the proper valve combination information stored in the memory map (734). Subsequently, the torque converter valve is disabled at 736 if a malfunction has been diagnosed in SV4. After the VALVE register is set with the proper combination of valves to be activated for the current GEARSTATE register indication, if any coils are diagnosed as non-functional, a coil check delay register, which is incremented during each timer-interrupt after a problem is indicated, is checked at 742 to determine if the problem has remained for more than 0.4 seconds. If so, the PROBLEM register is set at 744 and the VALVE TEST routine 746 (FIG. 5l) is then initiated. If the problem has not remained for more than 0.4 seconds, control of the program is shifted to the BEGIN routine 414. The second bit (DIFFERENCE BIT) is set at 748 if the time since a full voltage pull-in pulse (750) has been less than or equal to 240 msec. An indication of the time elapsing between the occurrence of a pull-in pulse is stored in one of the registers of the RAM. The register is incremented each time through the timer-interrupt routine.

The VALVE TEST routine 746 (FIG. 5l) begins at block 408 described above. If any bad gears are found during the test (410), the PROBLEM register is set to indicate that a solenoid failure has been diagnosed (760). The BADGEAR register is then checked to see if all the gears (bits 0–6) are bad at 762. If any gears are still available, those gears are flashed on the display 192 (764) and the program shifts to the COIL CHECK routine 766 which is essentially the latter portion of the OUTPUT routine 622 of FIG. 5k.

If no gears are available (762), the GEARSTATE register is set to indicate neutral (770 of FIG. 5m). The VALVE register is set so that all valves will be in the "off" condition, and "0" is flashed on the display 192 to indicate to the operator that no gears are available for use. Control of the program is then switched to the COIL CHECK routine 766.

The VALVE BAD routine 780 (FIG. 5m) is entered from the READ LEVER routine 450 (FIG. 5h) if the PROBLEM register indicates that a solenoid coil failure has been diagnosed (602). Referring now to FIG. 5m and 5l, if the solenoid valve problem flag is not set (782), the program shifts to the block 408. If the problem flag is set, the LEVER register is checked to see if neutral is indicated (784). If so, and if this is the first pass through the routine with the LEVER register indicating neutral (786), control is passed to block 408 of the VALVE TEST routine 746. During subsequent passes through the routine, control of the program is shifted to block 410 of the routine 746. If the LEVER register indicates reverse (788) and reverse gear is good (bit 0 of the BADGEAR register) at 790, then the GEARSTATE register is set equal to the LEVER register (792) and the state of the transmission indicated by GEARSTATE is output to the display. The VALVE is set for selecting the proper valves for the reverse gear. If reverse gear is not good (790), the GEARSTATE register is set to indicate neutral at 770. A "0" is flashed on the display and the VALVE register is set so that no valves are operated. When a problem is indicated at 782 and the LEVER register indicates other than neutral or reverse, program control is shifted to a NO PROBLEM routine 796 (FIG. 5h) if all valves other than those required for reverse and for the torque converter lockup are good (794). The NO PROBLEM routine 796 is initiated at 604 of the READ LEVER routine 450.

In the manual mode, any gear that is selected that is operable will result in a transmission shift to that gear. If the manual mode is selected (798) and the contents of the LEVER register indicate that a good gear is being selected (800), the GEARSTATE register will be set equal to the LEVER register and that gear will be displayed and selected at 792.

In the automatic mode, fourth gear only will be selected if any of the valves are bad provided that the fourth gear valve, SV3, is good (802). If fourth gear is not available, the GEARSTATE register will be set to indicate neutral and the transmission will be shifted to neutral at 770. When fourth gear is available and the automatic mode is selected, the GEARSTATE register is set for fourth gear and "4" is flashed on the display 192 and the solenoid valve SV3 is activated (804).

The timer-interrupt routine 400 (FIGS. 5n and 5o) provides the basis for the timing functions. The microprocessor timer is reset to 1.2 msec at the start of each timer-interrupt and is decremented at regular intervals. When the timer again reaches zero, the timer-interrupt is entered. All the delay registers (810) are incremented at the beginning of each timer-interrupt. The SOLENOID VALVE TEST register is checked to see if a valve test is in progress (812) and if so, the valves designated by the VALVE register are turned "on" every third time through the timer-interrupt (814). When no solenoid valve test is in progress, a determination is made at 816 whether or not a valve change has occurred by comparing the state of the VALVE register with a second register (PREVIOUS VALVE) which stores the same information at the VALVE register during the previous pass through the timer-interrupt. In addition, the DIFFERENCE BIT, which is set at 748 of the COIL CHECK routine 766 (FIG. 5k), is checked to determine if a momentary short- or open-circuit has occurred at 740. If a valve change has occurred or if the DIFFERENCE BIT is set, a 90-210 msec pulse is provided at the appropriate output terminals P10-P15 of the microprocessor 100 to provide adequate pull-in pulses to the valves designated by the VALVE register (818). The DIFFERENCE BIT is then reset and the PREVIOUS VALVE register is set equal to the VALVE register.

If no valve change has occurred or if the DIFFERENCE BIT has not been set at 816, the terminal PA6 on the expander 106 is checked to see if the supply voltage is in the high range or the low range. An indication that the voltage is in the high range at 820 results in the valves designated by the VALVE register being pulsed every third time through the timer-interrupt for 1.2 msec. This provides a 33 percent duty cycle which prevents the valves from overheating. If the supply voltage is not in the high range, i.e., the voltage is below approximately 21-24 volts, the valves are pulsed on every other time through the timer-interrupt for 1.2 msec (822). Therefore, the first part of the timer-interrupt routine 400 assures that an adequate pull-in pulse will be provided to reliably pull in the designated solenoid valves after a valve change is indicated or after a momentary short- or open-circuit (DIFFERENCE BIT is set at 823) which may have allowed the solenoid to drop out. Thereafter the valves are pulsed at one of two duty cycles depending on the supply voltage so that overheating is prevented while assuring that the valves designated by the VALVE register remain in the "on" condition.

Each time through the timer-interrupt routine 400, the timer register is incremented at 824 (FIG. 5o). The time clock register (TIME) is incremented each 1.2 msec until a pre-selected number of pick-up pulses are counted by the external interrupt routine 402 (FIG. 5n). If a loss of speed signal occurs, the time clock will continue counting beyond a pre-selected maximum time (826). If the time clock reaches this pre-selected maximum time without reaching the given pick-up pulse count, the GEARSTATE register is checked to determine if fourth gear or above is indicated (828). If fourth gear or above is indicated and the contents of the BADGEAR register indicate that all gears other than reverse are available (830), the FLAG 1 is checked to see if a downshift sequence is in progress (FLAG 1=1). If no downshift sequence is indicated, the flag is set equal to 1 at 834 and a downshift sequence for a sudden loss of speed signal is commenced. If at 826 the time clock has not reached the maximum time, the downshift sequence is checked at 836 and if not set, control is returned to that portion of the main body of the program which was interrupted by the timer-interrupt routine. If the GEARSTATE register indicates fourth gear or above (838) but the vehicle is accelerating (840), no decrementing of the GEARSTATE register is initiated. If no acceleration is indicated at 840, the GEARSTATE register is decremented one gear at a time at 5 second intervals (842). The downshift delay of 5 seconds, determined by the contents of a downshift sequence delay register which is incremented each time through the timer-interrupt routine, prevents a sudden downshift to the lowest gear which would otherwise occur when a sudden loss of speed signal condition occurs.

If at 838 the GEARSTATE register indicates less than fourth gear and the loading mode has not been selected (844), the GEARSPEED register is set for third gear at 846. If the loading mode is selected (844) and the GEARSTATE register indicates second or third gear (848), the register will be decremented one gear at a time at 5 second intervals (842) if the vehicle is not accelerating. If the GEARSTATE register indicates a gear below second gear (848), the GEAR-SPEED register is set for first gear at 850. FLAG 1 is set equal to zero at 852 if valves other than reverse and torque converter are found to be bad at 830. The downshift sequence is bypassed and the FLAG 1 is reset to zero at 852. When the time clock is found to be greater than the maximum time (826) and the GEARSTATE register indicates a gear below fourth gear (828) the flow in the interrupt routine goes directly to block 836.

For every magnetic pick-up pulse from the pick-up 42 (FIG. 2a), the external interrupt routine 402 (FIG. 5n) interrupts the main body of the program. The PULSE COUNTER register is incremented each time a pulse is detected (860). The contents of the PULSE COUNTER are then compared with a predetermined count constant. The predetermined count constant can be in the range of from about 30 to 240 in the preferred embodiment when a magnetic pick-up 42 is utilized which provides about 70 pulses per mile per hour of ground speed. If the contents of the pulse counter are less than the predetermined count constant (862), control is returned to the main body of the program. When the pulse counter reaches or exceeds the predetermined count constant, a new speed is computed at 864. For example, if the predetermined count constant is 60 and the magnetic pick-up 42 produces 70 pulses per mile per hour, a count of 120 msec on the time clock (TIME) would indicate a speed of:

$$\frac{1 \text{ mph}}{70 \text{ pulses/sec}} \times \frac{60 \text{ pulses}}{0.12 \text{ sec}} = \frac{50}{7} \text{ mph} = 7.1 \text{ mph}.$$

The ATIME register is loaded with the indication of the time required to accumulate the pre-selected number of magnetic pick-up pulses (1 bit = 1.2 msec). In the preferred embodiment, the vehicle speed indication used for determination of upshift and downshift during the routines, as well as the indications of the pre-selected upshift and downshift points stored in the memory, are stored in the form of the average time (ATIME) required to accumulate the pre-selected number of magnetic pick-up pulses rather than using a straight mile per hour figure for comparison. For example, in FIG. 5a at 422 the variable used for the speed is actually the contents of the ATIME register, and the fourth gear downshift speed indication that is compared with the contents of the register is actually an indication of the average time that would be required to accumulate the pre-selected number of mag pick-up pulses for the given shift point speed.

It will be apparent to those skilled in the art that various modifications in the circuitry and/or in the program flow of the microprocessor can be made without departing from the scope of the appended claims.

I claim:

1. In a mobile vehicle having selectable first and second modes of operation, a transmission system including a torque converter driven by a throttle controlled engine, wherein in the first mode of operation the vehicle is typically subjected to substantially heavier and more abrupt loading than in the second mode, selectively activatable lockup means for locking and unlocking the torque converter to provide direct drive and torque converter drive, respectively, therethrough, a transmission operably connected to the torque converter, said transmission shiftable up and down among a plurality of gear ratios, wherein the torque converter provides cushioning effect between the engine and transmission when in the unlocked condition, and wherein the engine when throttled down provides braking action to the transmission when the torque converter is locked, selectively activatable shifting means operably associated with the transmission for shifting the transmission among the gear ratios, and a speed sensor responsive to the speed of the transmission output to provide a speed signal indicative of the speed thereof, control means for activating the shifting means and lockup means comprising:

first means for establishing at least first, second and third selectable shifting patterns, each pattern defining a plurality of transmission gear ratio upshift points and downshift points corresponding to first, second and third sets of preselected speed signals, respectively, wherein at least said second shifting pattern also defines torque converter locking and unloading points corresponding to a fourth set of speed signals, respectively, and wherein said first shifting pattern also defines a torque converter locking point above a preselected output speed signal;

second means operably associated with the engine throttle and the first means for causing the first shifting pattern to be selected when the throttle is below a pre-selected engine speed setting while the vehicle is operating in the second mode and for causing the second shifting pattern to be selected when the throttle is above the pre-selected setting while the vehicle is operating in the second mode;

third means responsive to selection of the first mode of operation and operably associated with the first means for selecting the third shifting pattern when the first mode is selected and preventing torque converter lock-up so that said cushioning effect is provided; and fourth means connected between the first means and the shifting and lockup means responsive to the shifting pattern selected and to the speed signal to activate the shifting means and shift the transmission up and down in accordance with the defined upshift and downshift points of the selected pattern and to selectively activate the lockup means in accordance with the defined locking and unlocking points when the second shifting pattern is selected, and to provide said braking action above said output speed when the first pattern is selected.

2. The transmission system as set forth in claim 1 wherein said output speed signal corresponds to a vehicle ground speed of about 5 mph.

3. The transmission system as set forth in claim 1 wherein the torque converter is unlocked to provide torque converter drive when the third shifting pattern is selected to thereby provide said cushioning effect in the first mode.

4. The transmission system as set forth in claim 1 or 3 further comprising acceleration means responsive to the speed signal for providing an indication of transmission output speed acceleration, and downshift inhibit means responsive to the acceleration indication for preventing a transmission downshift, even when the speed signal indicates a speed below a defined transmission downshift point, when the transmission output is accelerating.

5. The transmission system as set forth in claim 4 further comprising upshift determination means for providing an upshift indication when the immediately previous transmission shift was an upshift, and wherein said downshift inhibit means is also responsive to the upshift determination means to prevent a downshift when the transmission output is accelerating and when an upshift indication is provided.

6. The transmission system as set forth in claims 1 or 3 wherein the transmission gear ratio upshift points of the first shifting pattern correspond to higher speed signals than do the speed signals for the gear ratio upshift points of the second shifting pattern so that the transmission is upshifted at higher speeds when the first shifting pattern is selected than when the second shifting pattern is selected.

7. The transmission system as set forth in claims 1 or 3 wherein the third shifting pattern includes a lowermost downshift point corresponding to a speed signal whereat the transmission is shifted to the lowest gear ratio of said gear ratios when the third shifting pattern is selected, and wherein the first and second shifting patterns each include a lowermost downshift point corresponding to a speed signal whereat the transmission is shifted to a gear ratio above the lowest gear ratio so that a downshift to the lowest gear ratio is prevented while the first and second shifting patterns are selected.

8. The transmission system as set forth in claim 7 wherein six gear ratios, first through sixth, are provided, and wherein when the first or the second shifting pattern is selected, the transmission is shifted among third through sixth gears, and when the third shifting pattern is selected, the transmission is shifting among first through sixth gears.

9. The transmission system as set forth in claim 8 wherein when the first shifting pattern is selected, the lockup means is activated to provide direct driven in fourth through sixth gears.

10. The transmission system as set forth in claims 1 or 3 wherein the second shifting pattern includes torque converter unlock points corresponding to speed signals indicating a lower transmission output speed than for the lock points associated with the same gear ratio to provide torque converter lock-unlock hysteresis and to provide torque converter drive at the lower speeds of each gear ratio and direct drive at the upper speeds of each gear ratio.

11. The transmission system as set forth in claims 1 or 3 including means responsive to acceleration of the vehicle for inhibiting the fourth means and preventing a transmission downshift from a gear ratio to a lower gear ratio when the vehicle is accelerating.

12. The transmission system as set forth in claims 1 or 3 further comprising a delay counter initiated in response to transmission upshift or downshift, and wherein said second means is also responsive to the count of the delay counter to prevent a transmission upshift or downshift for a predetermined time after the shift.

13. The transmission system as set forth in claim 12 including means responsive to acceleration of the vehicle for preventing a transmission downshift after a previous upshift if the vehicle is accelerating after the predetermined time.

14. The transmission system as set forth in claim 13 wherein the predetermined time is approximately 3 seconds.

15. The transmission system as set forth in claim 13 wherein the transmission upshift point to a given gear ratio on the selected shifting pattern corresponds to a transmission output speed greater than that for the downshift point from said given gear ratio to the next lower gear ratio so that upshift-downshift hysteresis is provided.

16. In a vehicle having selectable first and second modes of operation, a transmission system including a selectively lockable and unlockable torque converter with an input and output, a throttle controlled engine drivingly connected to the torque converter input, a shiftable transmission drivingly connected to the output of the torque converter and shiftable among a plurality of speed ratios to provide a variable speed transmission output and wherein direct drive and torque converter drive are provided from the engine to the transmission when the torque converter is locked and unlocked, respectively, and speed sensor means responsive to the speed of the transmission output to provide a speed signal proportional thereto, an automatic shift control comprising:

electrically operated shifting means for shifting the transmission;

first means for selecting either the first or second mode of operation;

second means for sensing whether selected engine speed is above or below a predetermined speed and providing a selected speed signal indicative thereof; and electronic control means operatively associated with the first and second means and the speed sensor means for operating the shifting means to shift the transmission among a first range of speed ratios at a first set of speed signals and for unlocking the torque converter when the second mode of operation is selected by the first switch means, for operating the shifting means to shift the transmission among a second range of speed ratios at a second set of speed signals and selectively locking and unlocking the torque converter at a third set of speed signals when the first mode is selected and the selected speed signal indicates selected engine speed is below the predetermined speed, and for operating the shifting means to shift the transmission among a range of speed ratios at a corresponding set of speed signals and locking the torque converter for direct drive while the transmission is shifted among said range when the first mode is selected and the selected speed signal indicates selected engine speed is below the predetermined speed.

17. The transmission system as set forth in claim 16 wherein the second means comprises an electrical switch having a first state when the selected engine speed is above the predetermined speed and a second state when the selected engine speed is below the predetermined speed.

18. The transmission system as set forth in claim 17 wherein the predetermined speed is approximately half the maximum engine operating speed.

19. The transmission system as set forth in claim 16 including means responsive to the speed signal for providing an acceleration signal when the output speed is increasing and means responsive to the acceleration signal for preventing a transmission shift from a given speed ratio to a lower speed ratio when the output speed is increasing.

20. The transmission system as set forth in claim 16 wherein the shifting means includes a plurality of selectively activatable solenoid circuits and further comprising check circuit means for detecting electrical faults in the circuits and providing an indication thereof.

21. The transmission system as set forth in claim 20 including means associated with the shifting means and responsive to the check circuit indication for preventing an attempted shift to a speed ratio utilizing a faulty solenoid circuit.

22. The transmission system as set forth in claims 20 or 21 including means for pulsing each solenoid circuit on and off, and producing a voltage spike when the circuit is continuous, and means for detecting the voltage spike.

23. In a vehicle having a transmission system including a torque converter driven by a selectively variable speed engine, selectively activatable lockup means for locking and unlocking the torque converter to provide, respectively, direct drive and torque converter drive therethrough, a transmission operably connected to the torque converter, said transmission shiftable up and down among a plurality of gear ratios, selectively activatable shifting means operably associated with the transmission for shifting the transmission among the gear ratios, and a speed sensor responsive to the speed of the transmission output to provide a speed signal indicative of the speed thereof, a control comprising:
first means for sensing whether a selected engine speed is above or below a predetermined speed and providing a first signal indicative thereof; and
electronic control means operably associated with the shifting means and responsive to the first signal for operating the shifting means to shift the transmission among a first range of gear ratios at a first set of speed signals and for locking the torque converter to provide direct drive when the first signal indicates the selected engine speed is below the predetermined speed, and for operating the shifting means to shift the transmission among a second range of gear ratios at a second set of speed signals and for locking and unlocking the torque converter at a third set of speed signals when the first signal indicates the selected engine speed is above the predetermined speed.

24. The transmission system as set forth in claim 23 wherein the electronic control means comprises a processor including memory means for storing shift signals indicative of the first, second and third sets of speeds, means responsive to the speed signals for providing an average speed indicative signal, and means for selectively comparing the stored shift signals corresponding to the first set, or the second and third sets, respectively, depending on the first signal indication, with the average speed indicative signal.

25. The transmission system as set forth in claims 23 or 24 further comprising means responsive to transmission output speed for providing an acceleration signal when the output speed is increasing, and wherein said electronic control means is also responsive to the acceleration signal for preventing a downshift from a given gear ratio to a lower gear ratio when output speed is increasing.

26. The transmission system as set forth in claim 25 further comprising delay means for preventing a shift for a predetermined time period after a previous shift.

27. The transmission system as set forth in claims 23 or 24 including means for automatically testing whether the selectively activatable shifting means is operable or inoperable to shift the transmission to a selected gear ratio and providing a test signal indicative thereof, and wherein the electronic control means is also responsive to the test signal for preventing an attempted shift to said selected gear ratio when the shifting means is inoperable.

28. The transmission system as set forth in claim 27 further comprising means responsive to the test signal for indicating operable gear ratios when the shifting means is inoperable to shift to a selected gear ratio.

29. The transmission system as set forth in claim 27 including means responsive to the test signal for shifting the transmission to a pre-selected gear ratio if the shifting means is inoperable to shift the transmission a gear ratio other than said pre-selected gear ratio.

30. The transmission system as set forth in claim 29 wherein said means responsive to the test signal shifts the transmission to neutral if the shifting means is inoperable to shift the transmission to said pre-selected gear ratio.

31. In a transmission having a plurality of solenoid operated valves selectively activatable individually or in preselected combinations to shift the transmission up and down among a plurality of gear ratios, an electronic control comprising:
storage means for storing first signals indicative of the valve or combination of valves required to be activated for shifting to each of the gear ratios;
first circuit means operably associated with the solenoid operated valves for automatically sensing whether each of said solenoid operated valves is in an operable or inoperable condition; and
means responsive to the first signals from said storage means and to the condition sensed by first circuit means for determining unusable gear ratios, said means responsive determining those gear ratios which require a valve which has been sensed by the first circuit means to be in an inoperable condition, and means for providing an indication of the gear ratios which are either usable or unusable.

32. The electronic control as set forth in claim 31 wherein said first circuit means comprises means for switching the solenoid of each valve on and off, and means for sensing an inductive current in the solenoid immediately after it is switched off.

33. The electronic control as set forth in claim 31 including first means for selecting a gear ratio and providing a gear select signal indicative thereof, and second means responsive to the gear select signal and the sensed condition of the solenoid operated valves for driving the valves required for the selected gear ratio only if the required valves are sensed to be in the operable condition.

34. The electronic control as set forth in claim 31 further comprising means for selecting a gear ratio, a voltage supply, a comparator responsive to the voltage of the voltage supply and providing a comparator signal indicative of the supply voltage, a switching circuit connected between the voltage supply and each solenoid, and third means responsive to the comparator signal and to the contents of the storage means for selectively operating the switching circuits at one of at least two different duty cycles depending on the supply voltage and driving the required solenoids for the gear ratio selected.

35. The electronic control as set forth in claim 34 wherein the control comprises means responsive to a gear ratio shift for providing a gear change indication, and wherein the third means is also responsive to the gear change indication for turning on the switching circuits corresponding to the solenoids required by the newly selected gear ratio continuously for a pre-selected period of time.

36. The electronic control as set forth in claim 34 including means for detecting an intermittant inoperable condition of a valve and providing a fault indication thereof, and means responsive to said fault indication for temporarily operating the switching circuits at a duty cycle higher than the said at least two different duty cycles when an intermittant inoperable condition is detected.

37. A method of automatically shifting a multiple gear ratio transmission having a plurality of selectively activatable solenoids wherein the gear ratio of the transmission is determined by the state of the solenoids, the method including the steps of:
  deriving a speed signal indicative of the output speed of the transmission;
  selecting a gear ratio based on the speed signal;
  determining the solenoid or solenoids required to be activated for achieving the selected gear ratio;
  automatically checking the operating condition of the solenoids and identifying those gear ratios that are unusable because of one or more inoperable solenoids; and
  after the step of checking, activating the required solenoid or solenoids for the selected gear ratio if said ratio has not been identified as unusable or alternatively preventing an attempted shift to the selected gear ratio if said ratio is identified as unusable.

38. The method as set forth in claim 37 wherein the step of checking includes pulsing the solenoids on and off and detecting a solenoid flyback voltage.

39. The method as set forth in claims 37 and 38 wherein the step of checking includes storing indications of the gear ratios utilizing solenoids identified as inoperable and the step of activating includes comparing the selected gear ratio with the stored indications.

40. A method of activating a plurality of solenoid operated control valves of a controllable shift transmission, wherein the valves activated determine the gear ratio of the transmission, the method including the steps of:
  (a) storing an indication of the valves activated for each gear ratio;
  (b) selecting a gear ratio;
  (c) selecting the valves to be activated from the gear ratio selected and the stored indication;
  (d) initially pulsing the solenoids of the valves selected in step (c) with a pull-in voltage pulse of at least a pre-selected duration and thereafter pulsing the solenoids of the selected valves with a pulse train having a variable pulse amplitude depending on supply voltage;
  (e) detecting the voltage level of the supply voltage; and
  (f) varying the duty cycle of the pulse train in accordance with variations in the supply voltage level to limit power variations in the solenoids due to supply voltage fluctuations.

41. The method as set forth in claim 40 further including the steps of:
  (g) monitoring the solenoids as they are pulsed to detect open- or short-circuits therein;
  (h) providing an indication of the time during which an open- or a short-circuit is detected; and
  (i) selecting an alternative gear ratio if the time indicated at step (h) is greater than a pre-selected time.

42. The method as set forth in claim 41 further including the step of:
  (j) again pulsing the solenoids of the valves selected in step (c) with a pull-in voltage pulse of at least a pre-selected duration if the time indication provided in step (h) is less than the pre-selected time.

43. A method of automatically shifting a controllable shift transmission and locking and unlocking a selectively variable speed engine driven torque converter drivingly connected to the transmission, said transmission having a plurality of solenoid valves, wherein the solenoid valves actuated determine the gear ratio of the transmission, said transmission having a plurality of gear ratios, the method including the steps of:
  providing a speed signal indicative of the transmission output speed;
  storing at least first and second shift patterns defining transmission shift points corresponding to two pre-selected sets of speed signals;
  sensing whether selected engine speed is above or below a predetermined speed;
  shifting the transmission up and down among the gear ratios at the shift points defined by the first shift pattern when selected engine speed is below the predetermined speed, and at the shift points defined by the second shift pattern when selected engine speed is above the predetermined speed; and
  locking the torque converter for direct drive when the transmission is shifted according to the first shift pattern, and selectively locking and unlocking the torque converter when the transmission is shifted according to the second shift pattern.

44. The method as set forth in claim 43 further including the steps of:
  monitoring the acceleration of the transmission output; and
  preventing a downshift to a lower gear ratio when the output is accelerating, regardless of the shift pattern and the speed signal indication.

45. The method as set forth in claims 43 and 44 further including the step of:
  selecting a maximum gear ratio above which no upshifts are to occur, and wherein the step of shifting the transmission up and down includes shifting up and down only among the gear ratios lower than and including the selected maximum gear ratio.

46. The method as set forth in claims 43 and 44 further including the step of selecting a first or a second mode of transmission operation and wherein the step of storing includes storing a third shift pattern defining transmission shift points corresponding to a third set of speed signals, and wherein the step of shifting the transmission includes said shifting according to the first and second shift patterns when the first mode of operation is selected, and shifting the transmission up and down among the gear ratios at the shift points defined by the third shift pattern when the second mode is selected.

47. The method as set forth in claim 46 further including the step of unlocking the torque converter when the second mode is selected.

48. The method as set forth in claims 43 and 44 further including the steps of:
  automatically testing the solenoid valves by selectively activating the solenoids and detecting short- or open-circuit conditions therein;

storing a fault signal indicative of the valves for which short-or open-circuits were detected; and outputting a diagnostic signal derived from the fault signal.

49. The method as set forth in claim 48 further including the step of automatically shifting the transmission to a preselected gear ratio after a short-or open-circuit is detected during the step of testing if no valve for said pre-selected gear ratio is detected as faulty.

50. A method of activating a plurality of electrically operated control valves of an engine-driven shiftable transmission, wherein the engine includes a control input for selecting a desired operating condition and wherein the valves activated determine the gear ratio of the transmission, the method including the steps of:

providing a speed signal indicative of the transmission output speed;

sensing a control input and providing a first or a second control signal if a first or a second operating condition, respectively, of the engine is selected;

storing first and second sets of shift point locations, each set of shift point locations corresponding to a set of preselected speed signals;

automatically selecting the first set of shift point locations when the first signal is sensed and the second set when the second signal is sensed;

after the step of automatically selecting, comparing the speed signal with the shift point locations of the selected set and selecting an optimum gear ratio from the set based on the speed signal;

storing a plurality of valve select signals, each valve select signal indicative of the valve or valves necessary to shift the transmission to a given gear ratio; and activating the valves indicated by the valve select signal for the selected gear ratio.

51. In a transmission having a plurality of solenoid operated valves selectively activatable to shift the transmission up and down among a plurality of gear ratios, including forward, reverse and neutral gear ratios, an electronic control comprising:

solenoid driving circuits connected to the valve solenoids;

gear selecting means for selecting a desired gear ratio;

solenoid activating means connected to the solenoid driving circuits and responsive to the selected gear ratio for operating the driving circuits to power the solenoid or solenoids required to shift to said selected gear ratio;

solenoid check circuit means for determining whether any of said required solenoid or solenoids are inoperable to shift to said selected gear ratio;

indicator means for providing a problem mode indication when a required solenoid is determined to be inoperable; and means responsive to the problem mode indication for shifting to a preselected gear ratio, regardless of the desired gear ratio selected, and preventing an attempted shift to a gear ratio for which a required solenoid has been determined to be inoperable.

52. The transmission system as set forth in claim 51 wherein the gear selecting means includes selectable automatic shift control and manual shift control modes, manual shift lever means for manually shifting the transmission when the manual shift control mode is selected, said manual shift lever means operable when a problem mode indication is provided to permit manually shifting to a gear wherein no required solenoid or solenoids have been determined to be inoperable.

53. The transmission system as set forth in claim 51 or 52 further including display means responsive to a problem mode indication for providing an indication of available gear ratios wherein all required solenoids or solenoids are determined to be operable.

54. The transmission system as set forth in claim 53 wherein the display means includes means for additionally providing an indication of the transmission gear ratio.

* * * * *

UNITED STATES PATENT AND TRADEMARK OFFICE
CERTIFICATE OF CORRECTION

PATENT NO.   : 4,414,863

DATED        : 15 November 1983

INVENTOR(S)  : Dean L. Heino

It is certified that error appears in the above-identified patent and that said Letters Patent is hereby corrected as shown below:

Column 25, line 31, delete "shifting" and insert -- shifted --; line 35, delete "driven" and insert -- drive --.

Column 29, line 36, delete "and" and insert -- or --; line 55, delete "depending" and insert -- dependent --.

Column 30, line 43, delete "and" and insert -- or --; line 50, delete "and" and insert -- or --; line 64, delete "and" and insert -- or --.

Column 32, line 34, delete "solenoids" and insert -- solenoid --.

Signed and Sealed this

Twenty-eighth Day of February 1984

[SEAL]

Attest:

GERALD J. MOSSINGHOFF

Attesting Officer

Commissioner of Patents and Trademarks